US012752655B2

(12) United States Patent
Hanashima

(10) Patent No.: US 12,752,655 B2
(45) Date of Patent: Oct. 6, 2026

(54) DISPLAY DEVICE, ENERGY MANAGEMENT SYSTEM, AND SCHEDULE DISPLAY METHOD

(71) Applicant: TOYOTA JIDOSHA KABUSHIKI KAISHA, Toyota (JP)

(72) Inventor: Tateki Hanashima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 787 days.

(21) Appl. No.: 18/136,527

(22) Filed: Apr. 19, 2023

(65) Prior Publication Data

US 2023/0398890 A1 Dec. 14, 2023

(30) Foreign Application Priority Data

Jun. 8, 2022 (JP) ................................ 2022-093107

(51) Int. Cl.

*H02J 7/00* (2026.01)
*B60L 53/30* (2019.01)
*B60L 53/60* (2019.01)
*H02J 7/92* (2026.01)

(52) U.S. Cl.

CPC ............ *B60L 53/305* (2019.02); *B60L 53/60* (2019.02); *H02J 7/92* (2026.01)

(58) Field of Classification Search

None

See application file for complete search history.

(56) References Cited

U.S. PATENT DOCUMENTS

2012/0053771 A1* 3/2012 Yoshida .................. B60L 55/00 701/22
2021/0376402 A1 12/2021 Tsuchiya
2021/0380012 A1 12/2021 Tsuda et al.

FOREIGN PATENT DOCUMENTS

JP 2015-186290 A 10/2015
JP 2021-065007 A 4/2021
JP 2021-191157 A 12/2021
WO WO 2020/100288 A1 5/2020

* cited by examiner

*Primary Examiner* — Arun C Williams

(74) *Attorney, Agent, or Firm* — Finnegan, Henderson, Farabow, Garrett and Dunner, LLP

(57) ABSTRACT

A mobile terminal functioning as a display device includes a first acquisition unit that acquires a first schedule indicating a time period in which charging or discharging of the power storage device is scheduled, a second acquisition unit that acquires a second schedule indicating a time period in which a demand response requesting charging or discharging of the power storage device is scheduled, and a display unit that displays a schedule window. The display unit simultaneously displays the first schedule and the second schedule on the schedule screen in an identifiable manner.

10 Claims, 17 Drawing Sheets

<CHARGE/DISCHARGE SCHEDULE DISPLAY>

<CHARGE/DISCHARGE SCHEDULE DISPLAY>

<CHARGE/DISCHARGE SCHEDULE DISPLAY>

DISPLAY DEVICE, ENERGY MANAGEMENT SYSTEM, AND SCHEDULE DISPLAY METHOD

CROSS-REFERENCE TO RELATED APPLICATION

This application claims priority to Japanese Patent Application No. 2022-093107 filed on Jun. 8, 2022, incorporated herein by reference in its entirety.

BACKGROUND

1. Technical Field

The present disclosure relates to a display device, an energy management system, and a schedule display method.

2. Description of Related Art

Electricity utilities may request energy management to administrators of power storage devices by demand response (DR). An example of the energy management is power adjustment of a power system. For example, WO 2020/100288 discloses a charging assistance system including a processor that generates charging plan data of a vehicle based on predicted power consumption of the vehicle, which is calculated based on a future travel schedule of the vehicle, and a charging condition set for the predicted stop location for the demand response.

SUMMARY

In the charging assistance system described in WO 2020/100288, the processor automatically generates the charging plan data of the vehicle based on the predicted power consumption of the vehicle and the charging condition set for the predicted stop location for the demand response (more specifically, the charging condition set based on the presence or absence of the demand response execution at the predicted stop location). However, WO 2020/100288 does not fully consider improving a user interface for a user of the vehicle to determine charge conditions himself/herself or to determine whether to participate in the DR.

WO 2020/100288 describes that power saving is requested during DR execution. However, the DR does not only require power saving. A normal DR is roughly classified into increase DR and decrease DR. The increase DR is basically a DR requiring increased demand. On the other hand, the decrease DR is a DR requesting a demand control or a reverse power flow. Typical methods of using the DR are methods in which a power transmission and distribution business operator generates either an increase DR or a decrease DR depending on the supply-and-demand condition of power that fluctuates from time to time. Hereinafter, a DR generated in this manner is also referred to as "normal DR". Furthermore, in recent years, retail electric utilities compare the cost of procuring power by themselves with the cost of procuring power by the DR. The retail electric utility may generate the DR if it determines that the DR has a greater economic advantage. Hereinafter, a DR generated in this manner is also referred to as "economic DR".

The administrator of the power storage device can participate in the DR by using the power storage device. However, WO 2020/100288 does not fully consider the development of a user interface that promotes the administrator of the power storage device to utilize the power storage device. In WO 2020/100288, it is not assumed that the administrator of the power storage device himself/herself selects a DR to participate from among a plurality of types of DR (for example, the normal DR and the economic DR).

Charging of the power storage device may be executed by timer charging. The timer charging is charging according to a reserved charging schedule. An administrator of a power storage device that routinely uses the timer charging tends to charge the power storage device at a predetermined time zone. On the other hand, the time zone in which the DR occurs is irregular. Thus, even if the schedule of the timer charging is once set in accordance with the timing of the DR, the schedule of the timer charging does not necessarily match the timing of the DR that occurs next. Therefore, a user interface for confirming whether the schedule of the timer charging matches the timing of the DR is required. In executing the DR using the power storage device, it is desired to further improve the user interface used by the administrator of the power storage device.

The present disclosure has been made in order to solve the above problems, and an object thereof is to facilitate a user to execute at least one of charging and discharging of a power storage device at an appropriate timing.

According to a first aspect of the present disclosure, there is provided a display device described below.

First Item

The display device includes: a first acquisition unit that acquires a first schedule indicating a time zone in which charging or discharging of a power storage device is scheduled; a second acquisition unit that acquires a second schedule indicating a time zone in which a demand response for requesting charging or discharging of the power storage device is scheduled; and a display unit that displays a schedule screen. The display unit simultaneously displays the first schedule and the second schedule on the schedule screen in an identifiable manner.

According to the display device, the first schedule and the second schedule are simultaneously displayed on the schedule screen in an identifiable manner. The user can confirm whether the schedule of charging or discharging matches the timing of the DR by looking at the schedule screen. If the schedule of charging or discharging does not match the timing of the DR, the user can change the schedule of charging or discharging in accordance with the timing of the DR. This makes it easier for the user to participate in the DR that the user desires to participate in. However, if the user does not want to participate in the DR, the user need not change the schedule of charging or discharging. According to the above configuration, the user can easily execute at least one of charging and discharging of the power storage device at an appropriate timing.

The display device according to the first item may have a configuration according to any one of the following second to seventh items.

Second Item

The display device according to the first item further includes the following features. The first acquisition unit acquires the first schedule indicating a time zone in which charging of the power storage device is scheduled (hereinafter, also referred to as a "charging schedule"), and the first schedule indicating a time zone in which discharging of the power storage device is scheduled (hereinafter, also referred to as a "discharging schedule"). The second acquisition unit acquires the second schedule indicating a time zone in which a demand response for requesting charging of the power storage device is scheduled (hereinafter, also referred to as an "increase DR schedule"), and the second schedule indicating a time zone in which a demand response for requesting discharging of the power storage device is scheduled (hereinafter, also referred to as a "decrease DR schedule"). The display unit simultaneously displays the following on the schedule screen in an identifiable manner: the charging schedule; the discharging schedule; the increase DR schedule; and the decrease DR schedule.

According to the display device, the user can confirm whether the charging schedule matches the timing of the increase DR and whether the discharging schedule matches the timing of the decrease DR by looking at the schedule screen. This makes it easier for the user to participate in the DR that the user desires to participate in. According to the above configuration, the user can easily execute charging and discharging of the power storage device at an appropriate timing.

Third Item

The display device according to the first or second item further includes the following features. The display device further includes a first DR distinguishing unit that distinguishes the demand response for a power transmission and distribution business operator and the demand response for a retail electric utility. The display unit is configured to display the following on the schedule screen in a manner distinguished from each other: the second schedule indicating a time zone in which the demand response for the power transmission and distribution business operator is scheduled; and the second schedule indicating a time zone in which the demand response for the retail electric utility is scheduled.

According to the display device, the DR for the power transmission and distribution business operator (for example, the normal DR) and the DR for the retail electric utility (for example, the economic DR) are displayed on the schedule screen in a manner distinguished from each other. This makes it easier for the user to participate in the DR that the user desires to participate in. The user can easily plan at least one of charging and discharging so that at least one of charging and discharging of the power storage device is executed at an appropriate timing based on the above DR information.

The user of the display device may be a consumer or a retail electric utility who has concluded a contract with each of the above-described power transmission and distribution business operator and retail electric utility regarding a power transaction (for example, power purchase or power sale).

Fourth Item

The display device according to any one of first to third items further includes the following features. The display device further includes a first information management unit that manages information indicating whether the demand response is fixed. The display unit is configured to display the following on the schedule screen in a manner distinguished from each other: the second schedule indicating a time zone in which the fixed demand response is scheduled; and the second schedule indicating a time zone in which the unfixed demand response is scheduled.

According to the display device, the fixed DR and the unfixed DR are displayed on the schedule screen in a manner distinguished from each other. This makes it easier for the user to participate in the DR that the user desires to participate in. For example, the schedule of an unfixed DR may be cancelled. For this reason, the user may not wish to change the schedule of charging or discharging in accordance with such a DR. The user can easily plan at least one of charging and discharging so that at least one of charging and discharging of the power storage device is executed at an appropriate timing based on the above DR information.

Fifth Item

The display device according to any one of first to fourth items further includes the following features. The display device further includes: a second information management unit that manages information about a supply-and-demand condition of an external power source for which supply-and-demand is adjusted by the demand response; and a second DR distinguishing unit that distinguishes the demand response in accordance with a degree of tightness of power supply and demand of the external power source. The display unit is configured to display the second schedule of each demand response that has been distinguished by the second DR distinguishing unit on the schedule screen in a manner distinguished from each other.

The higher the degree of tightness in the power supply and demand of the external power source, the higher the necessity of the DR tends to be. According to the display device, a plurality of types of the DR distinguished according to the degree of tightness of power supply and demand of the external power source is displayed on the schedule screen in a manner distinguished from each other. Therefore, the user can be prompted to actively participate in the DR when the necessity of the DR is high. The user can easily plan at least one of charging and discharging so that at least one of charging and discharging of the power storage device is executed at an appropriate timing based on the supply-and-demand condition of the external power source.

Sixth Item

The display device according to any one of first to fifth items further includes the following features. The display device further includes: a changing unit that changes the first schedule displayed on the schedule screen in response to a user operation on the schedule screen; and a transmission unit that transmits the first schedule that has been changed by the changing unit to a first control device able to control at least one of charging and discharging of the power storage device.

According to the display device, the user can easily change the first schedule (the schedule of charging or discharging) in accordance with the second schedule (the schedule of the DR). When the changed first schedule is transmitted to the first control device, the first control device can easily control charging or discharging of the power storage device based on the changed first schedule. The schedule screen may be a touch panel screen.

The first control device may be a control device mounted on a resource including the power storage device. The resource may be an automobile, or may be a vehicle other than an automobile (a railcar, a ship, an airplane, etc.), an unmanned mobile object, an electric machine (a lighting device, an air conditioning facility, etc.), or a stationary power storage system. The resource may include at least one of an inverter that performs alternating current (AC)/direct current (DC) conversion and a DC/DC converter that performs DC/DC conversion.

Seventh Item

The display device according to any one of first to sixth items further includes the following features. The display unit is configured to display the first schedule and the second schedule set in the same time zone on the schedule screen in a superimposed manner. The display device further includes a switching unit that switches whether to allow a second control device able to control at least one of charging and discharging of the power storage device to execute charging or discharging of the power storage device in accordance with the second schedule displayed superimposing the first schedule, in response to a user operation on the schedule screen.

As described above, the first schedule and the second schedule set in the same time zone are displayed in a superimposed manner, so that the user can easily grasp the DR that the user can participate in. In addition, the user can easily switch whether to participate in the DR by operating the scheduling screen. The second control device may be a server that performs remote control of at least one of charging and discharging of the power storage device based on the reception of the permission.

The display unit may display, in an identifiable manner, whether the first schedule and the second schedule overlap each other. The display unit may display the overlapping portion and the non-overlapping portion in an identifiable manner by changing a display mode (for example, a color or a pattern) between the overlapping portion and the non-overlapping portion for each of the partially overlapping first schedule and second schedule.

According to a second aspect of the present disclosure, there is provided an energy management system described below.

Eighth Item

The energy management system includes: an energy management device that requests, by a demand response, charging or discharging of a power storage device electrically connectable to an external power source; and the display device according to any one of first to seventh items.

According to the above-described energy management system, it is possible to suitably execute the energy management by the DR. With the display device according to any one of the above, the user can easily execute at least one of charging and discharging of the power storage device at an appropriate timing.

The external power source may be a commercial power source of a retail electric utility, or may be a power grid (for example, a microgrid or a large-scale power grid developed as an infrastructure) that supplies power to a predetermined area. The external power source above may supply AC power or DC power.

The energy management system according to the eighth item may have the following configuration according to the ninth item or the tenth item.

Ninth Item

The energy management system according to the eighth item further includes the following features. The external power source is a power system. The power storage device is a power storage device mounted on a vehicle. The first acquisition unit of the display device is configured to acquire information on the first schedule from an input device that receives an input from a user. The second acquisition unit of the display device is configured to acquire information on the second schedule from a communication device that receives information from an outside. Each of the display device, the input device, and the communication device is mounted on a mobile terminal that manages information of the vehicle.

Tenth Item

The energy management system according to the eighth item further includes the following features. The external power source is a power system. The power storage device is a power storage device mounted on a vehicle. The first acquisition unit of the display device is configured to acquire information on the first schedule from an input device that receives an input from a user. The second acquisition unit of the display device is configured to acquire information on the second schedule from a communication device that receives information from an outside. Each of the display device, the input device, and the communication device is mounted on the vehicle.

According to the first acquisition unit, the user can input a desired first schedule to the display device. According to the second acquisition unit, the second schedule can be received from an external computer. For example, an external computer (e.g., a cloud server) with high computational capability may be caused to calculate an appropriate schedule. The external computer may calculate the second schedule using at least one of the supply-and-demand condition of the power system, the weather information, and the power price information. According to the energy management system of the ninth or tenth item, it is possible to suitably execute energy management of the power system by using the power storage device mounted on the vehicle. In addition, the vehicle user (the administrator of the vehicle) can easily execute at least one of charging and discharging of the power storage device at an appropriate timing using the display device.

The vehicle may be an electrified vehicle. The electrified vehicle is an automobile (hereinafter also referred to as an "xEV") that uses electric power as all or part of a power source. The xEV includes a battery electric vehicle (BEV), a plug-in hybrid electric vehicle (PHEV), a fuel cell electric vehicle (FCEV), and the like. The mobile terminal may be a smart phone, a laptop, a tablet terminal, a wearable device (e.g., a smart watch or smart glasses), or an electronic key.

According to a third aspect of the present disclosure, there is provided a schedule display method including: setting information on a schedule of at least one of charging and discharging of a power storage device to an information terminal; requesting, by a demand response, the information terminal to charge or discharge the power storage device; and simultaneously displaying the following on the same schedule screen by the information terminal that has received a request by the demand response: a first schedule indicating a time zone in which charging or discharging of the power storage device is scheduled; and a second schedule indicating a time zone in which the demand response is scheduled.

According to the schedule display method, similarly to the display device described above, the user can easily execute at least one of charging and discharging of the power storage device at an appropriate timing.

The information terminal may be the mobile terminal described above, a stationary computer, or a computer mounted on a mobile object such as an automobile.

According to the present disclosure, the user can easily execute at least one of charging and discharging of the power storage device at an appropriate timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
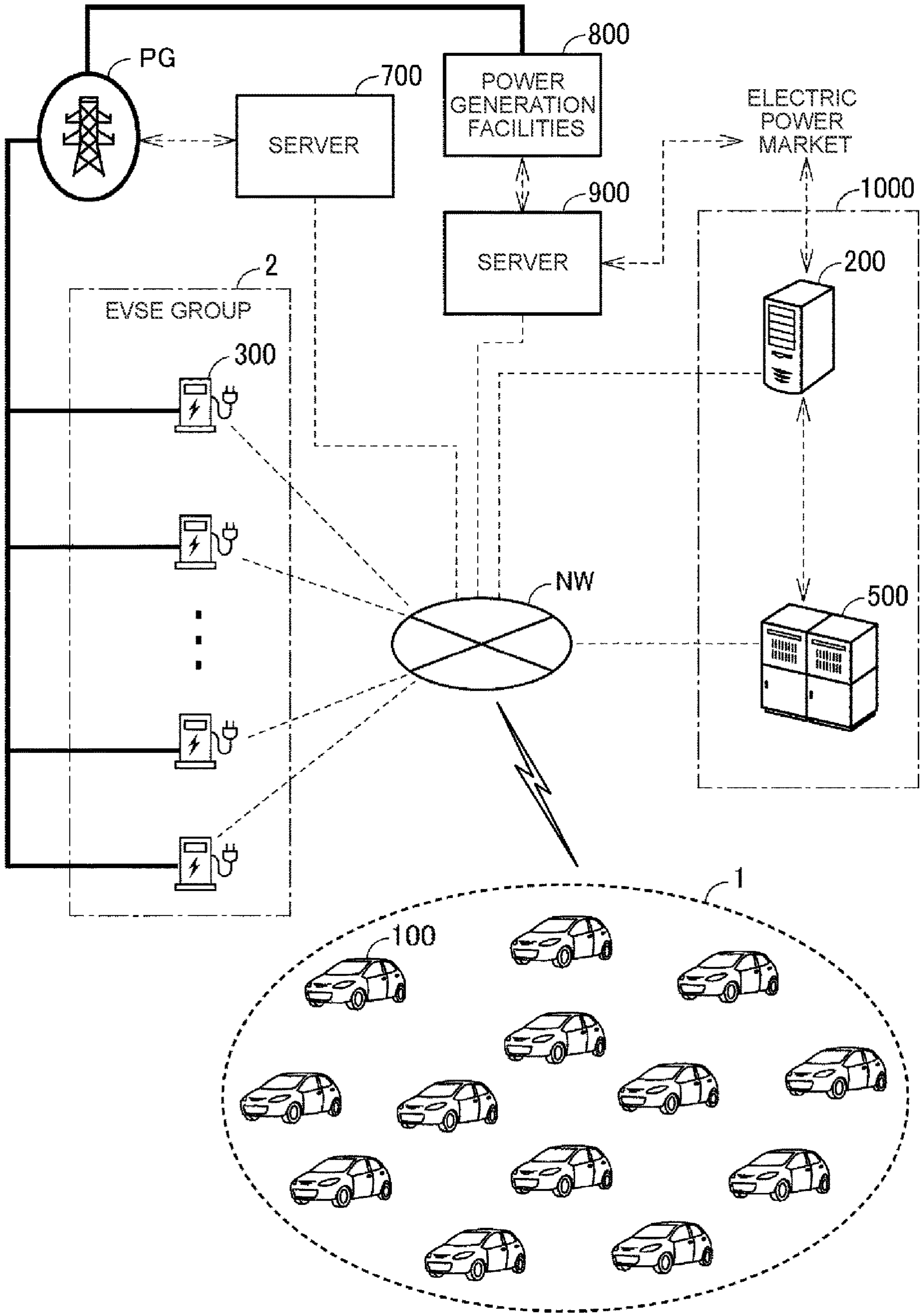
FIG. 1 is a diagram illustrating a schematic configuration of an energy management system according to an embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram illustrating a schematic configuration of an energy management system according to an embodiment of the present disclosure. Referring to FIG. 1, the energy management system according to this embodiment includes a vehicle group 1, an EVSE group 2, a server 700, a power generation facility 800, a server 900, and a management device 1000. The management device 1000 includes servers 200 and 500. EVSE means Electric Vehicle Supply Equipment.

Each of the servers 200,500,700,900 is a computer comprising, for example, a Human Machine Interface (HMI and a communication interface (I/F). Each computer includes a processor and a storage device. In addition to programs executed by the processor, information (for example, a map, a mathematical expression, and various parameters) used in the program is stored in the storage device. HMI includes an inputting device and a displaying device. HMI may be a touch panel display.

The power system PG is a power grid constructed by a transmission and distribution facility. A plurality of power plants (not shown) is connected to the power system PG. The power system PG is supplied with electric power from their power plants. In this embodiment, the power transmission and distribution company corresponds to TSO (system operator) of the power system PG (commercial power supply). The power system PG provides AC power (e.g., single-phase or three-phase AC power). The server 700 corresponds to a computer belonging to a power transmission and distribution company. The server 700 incorporates a medium feed system (a system of a central feed command station) and a simple command system.

The server 500 periodically communicates with each vehicle included in the vehicle group 1. In this embodiment, the vehicles included in the vehicle group 1 are xEV. The vehicles included in the vehicle group 1 are configured to be operable as the adjusting force of the power system PG. The vehicles included in the vehicle group 1 are vehicles (POV) owned by individuals. A user of the vehicle corresponds to an administrator who manages the vehicle. The number of vehicles included in the vehicle group 1 may be 5 or more and less than 30, 30 or more and less than 100, or 100 or more. The vehicle group 1 includes a vehicle 100 having a configuration (see FIG. 2) described later. The configuration of the vehicle 100 and the other vehicles in the vehicle group 1 may be the same or different.

EVSE group 2 includes a plurality of EVSE supplied with power from the power system PG. The servers 200 communicate with the respective EVSE as needed. EVSE group 2 includes an EVSE 300 having a configuration (see FIG. 2) to be described later. EVSE group 2 may include a plurality of types of EVSE (for example, a normal charger and a quick charger). EVSE may include both a public EVSE (e.g., an EVSE installed in a commercial establishment, a car dealer, or a parking area of an expressway) and a non-public EVSE (e.g., a home EVSE). The number of EVSE included in EVSE group 2 is arbitrary.

The management device 1000, the server 700, the server 900, the vehicles included in the vehicle group 1, and EVSE included in EVSE group 2 are configured to be able to communicate with each other via a communication network NW. The server 700,900 communicates with the server 200 via a communication network NW. In the management device 1000, the server 200 and the server 500 are configured to be able to communicate with each other. The communication network NW is, for example, a wide area network constructed by the Internet and a radio base station. The vehicles are configured to access the communication network NW via radio communication and to be connected to the communication network NW. The respective EVSE are connected to a communication network NW via, for example, a communication line. Note that the communication mode is not limited to the above, and can be changed as appropriate. For example, EVSE may be connected to the communication network NW by radio communication.

The server 900 corresponds to a computer belonging to a retail electric utility. The retail electric utility procures electric power in the electric power market and the power generation facility 800, and sells the procured electric power to a plurality of consumers. Electricity markets are, for example, spot markets and pre-hourly markets opened and operated by wholesale electricity exchanges. The power generation facility 800 is, for example, a power generation facility attributable to a power generation business operator with which a retail electric power business operator has concluded a relative contract. The power system PG is configured to provide power in addition to EVSE group 2 shown in FIG. 1. Specifically, the power system PG is electrically connected to a not-shown building (for example, a house, a factory, or a commercial facility). A retail electricity utility pays a transmission/distribution charge to a power transmission/distribution business operator, and provides electric power to consumers by using a power system PG. Generation facility 800 may include at least one of pumped storage, solar, wind, hydroelectric, geothermal, biomass, and nuclear.

Figure 2:
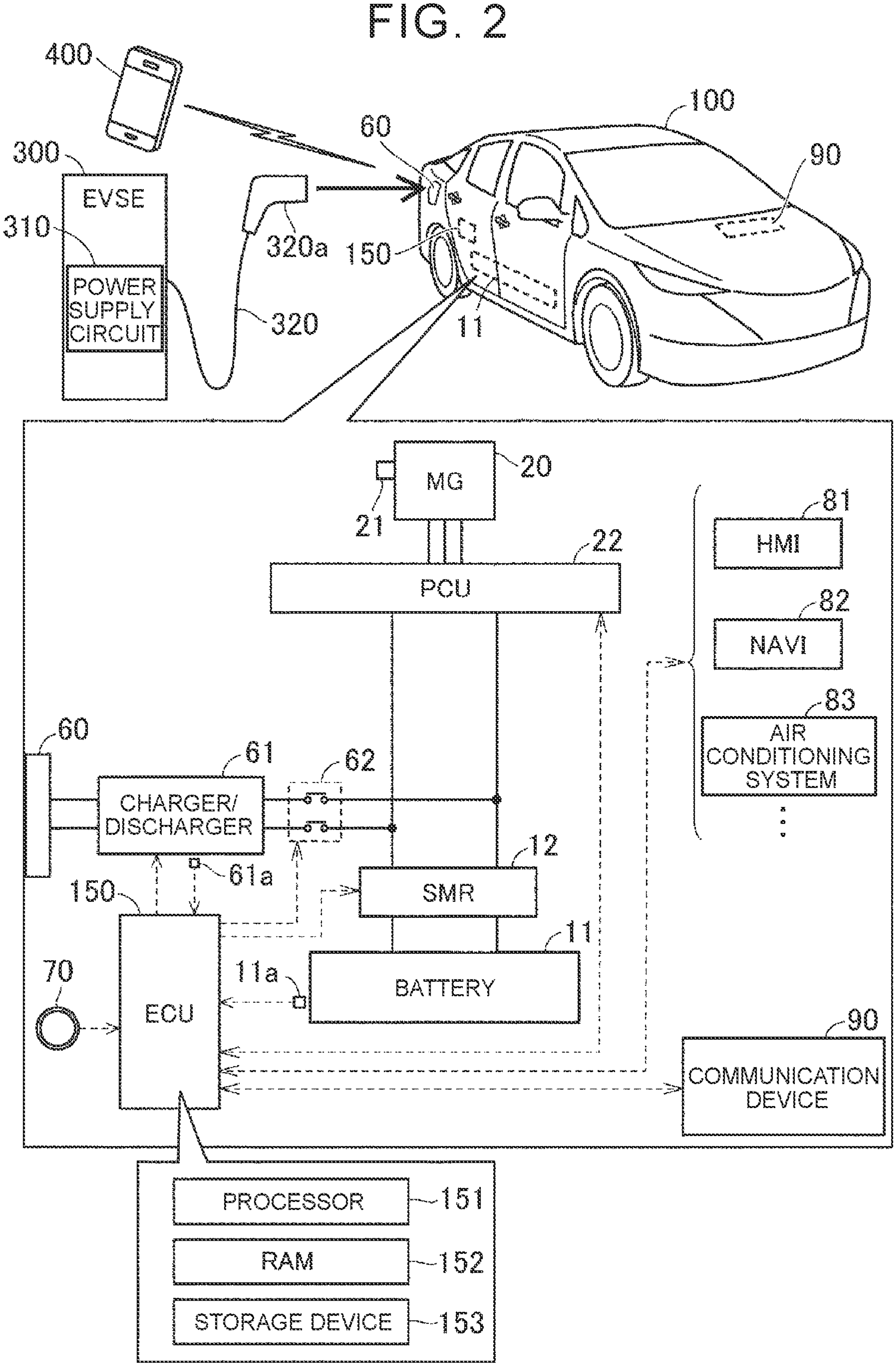
FIG. 2 is a diagram showing a configuration of the vehicles and EVSE shown in FIG. 1.

FIG. 2 is a diagram illustrating a configuration of the vehicles 100 and EVSE 300. Referring to FIG. 2 in conjunction with FIG. 1, EVSE 300 is configured to receive power from a power system PG to provide power. EVSE 300 incorporates power circuitry 310 and includes a charging cable 320. The power circuitry 310 is electrically connected to the power system PG. The charging cable 320 has a connector 320*a* at its distal end, and includes a communication line and a power line therein. One electric wire may also serve as both a communication line and a power line. The power circuitry 310 converts the electric power supplied from the power system PG into electric power suitable for power supply to the vehicles 100, and outputs the converted electric power to the charging cable 320. EVSE 300 outputs power to be supplied to the vehicles 100 from the connector 320*a*.

The vehicle 100 includes an inlet 60 to which the connector 320*a* can be attached and detached. The inlet 60 corresponds to a charging/discharging port that functions as both a charging port and a discharging port. The vehicle 100 is electrically connected to the power system PG via EVSE 300 by connecting the connector 320*a* of the charging cable 320 connected to the main body of EVSE 300 to the inlet 60 of the vehicle 100 in the parked state (hereinafter, also referred to as a "plug-in state"). On the other hand, for example, while the vehicle 100 is traveling, the vehicle 100 is not electrically connected to each of EVSE 300 and the power system PG (hereinafter, also referred to as a "plug-out state"). Although only the inlet 60 corresponding to EVSE 300 power supply system is illustrated in FIG. 2, the vehicle 100 may include a plurality of inlets so as to support a plurality of types of power supply systems (for example, AC system and DC system).

The vehicle 100 further includes a battery 11, a System Main Relay (SMR) 12, a Motor Generator (MG) 20, a Power Control Unit (PCU) 22, and an electronic control unit (hereinafter, referred to as "Electronic Control Unit (ECU)" 150. ECU 150 includes a processor 151, a Random Access Memory (RAM) 152, and a storage device 153. ECU 150 may be a computer. The storage device 153 is configured to be able to store the stored information. In addition to the program, information (for example, a map, a mathematical expression, and various parameters) used in the program is stored in the storage device 153. In this embodiment, the processor 151 executes a program stored in the storage device 153 to perform various kinds of control (for example, charge control and discharge control of the battery 11) in ECU 150.

The battery 11 stores electric power for traveling by the vehicle 100. The vehicle 100 is configured to be able to travel using electric power stored in the battery 11. Vehicles 100 according to this embodiment are battery electric vehicle (BEV without engines (internal combustion engines). As the battery 11, a known electric storage device for a vehicle (for example, a liquid-type secondary battery, an all-solid-state secondary battery, or an assembled battery) can be employed. Examples of a vehicle secondary battery include a lithium ion battery and a nickel-metal hydride battery.

Vehicle 100 further comprises a monitoring module 11*a* for monitoring the condition of battery 11. The monitoring module 11*a* includes various sensors for detecting the status (e.g., voltage, current, and temperature) of the battery 11, and outputs the detection result to ECU 150. The monitoring module 11*a* may be a Battery Management System (BMS that further includes a State Of Charge (SOC) estimation function, a State of Health (SOH) estimation function, a cell-voltage equalization function, a diagnostic function, and a communication function in addition to the sensor function. ECU 150 may obtain the status of the battery 11 (e.g., temperature, current, voltage, SOC, and internal resistance) based on the output of the monitoring module 11*a*.

The vehicle 100 further includes a charger/discharger 61 and a charge/discharge relay 62. The charger/discharger 61 and the charge/discharge relay 62 are located between the inlet 60 and the battery 11. Each of the charger/discharger 61 and the charge/discharge relay 62 is controlled by an ECU 150. In this embodiment, a charge/discharge line including the inlet 60, the charger/discharger 61, and the charge/discharge relay 62 is connected between SMR 12 and PCU 22. However, the present disclosure is not limited thereto, and a charge/discharge line may be connected between the battery 11 and SMR 12.

In this embodiment, the charger/discharger 61 functions as both a charging circuit and a discharging circuit. The charger/discharger 61 charges the battery 11 using the electric power input from the outside of the vehicle to the inlet 60. The charger/discharger 61 discharges the electric power of the battery 11 to the outside of the vehicle through the inlet 60. The charger/discharger 61 includes a power conversion circuit. The power conversion circuit includes, for example, a bidirectional inverter. The power conversion circuitry may bi-directionally perform DC (direct current) to AC (alternating current) conversion. The charge/discharge relay 62 switches connection/disconnection of the power path from the inlet 60 to the battery 11. Vehicle 100 further includes a monitoring module 61*a* for monitoring the status of charger/discharger 61. The monitoring module 61*a* includes various sensors (e.g., a current sensor and a voltage sensor) for detecting the status of the charger/discharger 61, and outputs the detection result to ECU 150.

In the vehicle 100 in the plug-in state, external charging and external power supply are enabled. The external charging is, in other words, charging of the battery 11 by electric power from the outside of the vehicle. The external power supply is, in other words, the power supply to the outside of the vehicle by the electric power of the battery 11. The vehicles 100 can adjust the power of the power system PG by external charge and external power supply. Power for external charging is supplied from the power system PG to the inlet 60 through the charging cable 320 of EVSE 300, for example. The charger/discharger 61 converts the electric power (for example, AC electric power) received by the inlet 60 into electric power (for example, DC electric power) suitable for charging the battery 11, and outputs the converted electric power to the battery 11. Power for external power supply is supplied from the battery 11 to the charger/discharger 61. The charger/discharger 61 converts the DC power supplied from the battery 11 into power suitable for external power supply (for example, AC power), and outputs the converted power to the inlet 60. The vehicles 100 are configured to be capable of reverse power flow with respect to the power system PG. When either external charging or external power supply is performed, the charge/discharge relay 62 is brought into a closed state (connected state), and when neither external charging nor external power supply is performed, the charge/discharge relay 62 is brought into an open state (shut-off state).

MG 20 is, for example, a three-phase AC motor generator. MG 20 functions as a driving motor of the vehicles 100. MG 20 is driven by PCU 22 to rotate the drive wheels of the vehicles 100. Further, MG 20 performs regenerative power generation and outputs the generated electric power to the battery 11. Vehicle 100 further includes a motor sensor 21 that monitors the status of MG 20. The motor sensor 21 includes various sensors (e.g., a current sensor, a voltage sensor, and a temperature sensor) that detect the status of MG 20, and outputs the detected data to ECU 150. The number of driving motors included in the vehicle 100 is arbitrary, and may be one or two or three or more. The driving motor may be an in-wheel motor.

PCU 22 drives MG 20 using the electric power supplied from the battery 11. SMR 12 switches the connection/disconnection of the power path from the battery 11 to PCU 22. PCU 22 includes, for example, inverters and converters. Each of SMR 12 and PCU 22 is controlled by an ECU 150. SMR 12 is brought into a closed state (connected state) when the vehicles 100 are traveling. SMR 12 is also closed when power is exchanged between the battery 11 and the inlet 60 (and thus the outside of the vehicle).

The vehicle 100 further includes a HMI 81, a navigation system (hereinafter, also referred to as "NAVI") 82, an air conditioner 83, and a communication device 90. The battery 11 also supplies power directly or indirectly to these devices (accessories). The battery 11 may supply electric power to the accessories via an accessory battery (not shown).

HMI 81 includes an inputting device and a displaying device. HMI 81 may include a touch panel display. HMI 81 may include a meter panel and/or a head-up display. HMI 81 may include a smart speaker that accepts audio input.

NAVI 82 includes a touch panel display, a Global Positioning System (GPS module, a processor, and a storage device (neither of which is shown). The storage device stores map information. The touch panel display accepts input from a user, and displays a map and other information. GPS module is configured to receive signals (hereinafter referred to as "GPS signals") from GPS satellites (not shown). NAVI 82 is configured to detect the position of the vehicle 100 using GPS and to be capable of displaying the position of the vehicle 100 on the map in real time. NAVI 82 searches for a route to find an optimum route (for example, the shortest route) from the present position to the destination of the vehicles 100. NAVI 82 may sequentially update the map-information according to Over The Air (OTA).

The air-conditioning device 83 includes an air-conditioning fan, a filter, a temperature adjustment unit, a temperature sensor, and a control device. The temperature adjustment unit may include an evaporator, a heater core, and an air mix door. The temperature sensor detects a temperature in the vehicle cabin of the vehicle 100. In the air conditioner 83, the air blown by the air conditioning fan passes through the filter and is temperature-adjusted by the temperature adjustment unit. The air conditioner 83 blows the temperature-adjusted air into the vehicle cabin of the vehicle 100. The control device of the air conditioner 83 controls the air conditioning fan and the temperature adjustment unit so that the temperature in the vehicle cabin of the vehicle 100 detected by the temperature sensor becomes a predetermined target temperature. The target temperature is set by ECU 150. ECU 150 sends a control signal to the air conditioner 83. The operation/shutdown of the air conditioner 83 is switched by an ECU 150.

The communication device 90 includes various communication I/F. ECU 150 communicates with an external device of the vehicles 100 through the communication device 90. The communication device 90 includes a radio (e.g., Data Communication Module (DCM) accessible to the communication network NW. The radio communication device may include a 5G or 6G (fifth or sixth-generation mobile communication system)-compatible communication I/F. Vehicle 100 wirelessly communicates with each of servers 200 and 500 in both a plug-in state and a plug-out state, for example. In this embodiment, the vehicle 100 receives commands or notifications from each of the servers 200 and 500 at the wireless communication device. However, the present disclosure is not limited thereto, and the vehicles 100 may wirelessly communicate with at least one of the servers 200 and 500 via EVSE 300 in the plug-in status.

The mobile terminal 400 is a terminal that is carried and operated by an administrator (vehicle user) of the vehicle 100. The mobile terminal 400 is configured to manage information of the vehicle 100. In this embodiment, a smartphone including a touch panel display is adopted as the mobile terminal 400. The mobile terminal 400 corresponds to an example of an "information terminal" according to the present disclosure. However, the mobile terminal 400 is not limited to a smartphone, and any terminal can be adopted.

The communication device 90 includes a communication I/F for directly communicating with the mobile terminal 400 existing in the vehicle or in the area around the vehicle. The communication device 90 and the mobile terminal 400 may perform short-range communication such as radio Local Area Network (LAN), Near Field Communication (NFC), or Bluetooth. However, an arbitrary communication method can be adopted as a communication method between the vehicle 100 and the mobile terminal 400.

The mobile terminal 400 is registered in the server 200, 500 in advance, and is configured to be capable of wireless communication with the server 200, 500. A predetermined application software (hereinafter, referred to as a "mobile application") is installed in the mobile terminal 400. The server 200,500 performs predetermined authentication before starting communication with the mobile terminal, and performs communication only with the mobile terminal that has succeeded in the authentication. As a result, it is possible to prevent the mobile terminal not registered in the server 200,500 from performing unauthorized communication. The user of the vehicle 100 can start communication with the server 200,500 by inputting predetermined authentication information (information for successful authentication) to the mobile terminal 400. Further, by registering predetermined authentication information in the mobile application, it is possible to omit the input of the authentication information. The mobile terminal 400 can exchange information with the server 200,500 through the mobile application.

In this embodiment, the mobile terminal 400 includes a position sensor. The position sensor may be a sensor using a GPS. The mobile terminal 400 transmits information indicating the position of the user (hereinafter, also referred to as "user position information") to the server 500 periodically or in response to a request from the server 500.

The on/off of the vehicle system (the system that controls the vehicle 100) including ECU 150 is switched by the user operating the activation switch 70. The activation switch 70 is installed in, for example, a vehicle cabin of the vehicle 100. When the activation switch 70 is turned on, the vehicle system is activated. When the activation switch 70 is turned off while the vehicle system is operating, the vehicle system is stopped. However, in the traveling vehicle 100, the off operation of the activation switch 70 is prohibited. In general, the start-up switch of a vehicle is referred to as a "power switch" or an "ignition switch" or the like.

Referring again to FIG. 1, the server 200 corresponds to a computer belonging to an aggregator. An aggregator is an electric utility that provides an energy management service by bundling a plurality of distributed energy resources (hereinafter, also referred to as "Distributed Energy Resources (DER"). As will be described later, the aggregator performs energy management using DER. The vehicles included in the vehicle group 1 can function as DER. The servers 200 may cause these DER to function as VPP (virtual power plants) by remotely and integrally controlling a plurality of DER (for example, vehicles included in the vehicle group 1). Note that the server 500 may belong to an aggregator or may belong to an automobile manufacturer.

The servers 200 may perform demand response (DR) in order to integrate and control a plurality of DER as VPP. DR requires DER to adjust the power of the power system PG. The server 200 is configured to be able to bid on a power market (e.g., a supply-and-demand adjustment market). The supply-demand adjustment market is a market in which TSO of the power system PG (power transmission and distribution company) procures the adjustment power. The server 200 may use DR to cause a plurality of DER (for example, vehicles included in the vehicle group 1) to adjust the power of the power system PG requested by the server 700 or to adjust the power of the power system PG awarded in the power marketplace. In this embodiment, the power regulation of the power system PG corresponds to an exemplary "energy management" according to the present disclosure.

By DER participating in DR (power conditioning), flexibility and academia can be imparted to the power system PG. The administrator of DER participating in DR allows remote control to the servers 200. In circumstances where remote control of DER by the server 200 is permitted, the server 200 may remotely control DER such that DER regulates the power system PG. The power control of the power system PG is, for example, charge promotion, charge suppression, discharging, power consumption promotion, or power consumption suppression. The servers 200 may control DER to resolve the imbalance when an imbalance is expected to occur with respect to the concurrent amounts of power system PG. For example, when the server 200 remotely controls the vehicles 100, ECU 150 controls the charger/discharger 61 in accordance with a command from the server 200. However, even if the servers 200 transmit commands to DER, DER cannot perform power adjustment by remote control unless DER for power adjustment is ready. For this reason, the administrator of DER participating in DR is required to prepare DER prior to starting DR.

Note that the type of power adjustment is arbitrary. The power adjustment may be, for example, any of a supply-demand adjustment, a power supply stabilization, a load tracking, and a frequency adjustment. DER may operate as a regulating force or a reserve force of the power system PG by remote control.

Prior to starting the above-described DR, the servers 200 transmit DR request to the terminals set for each vehicle included in the vehicle group 1. DR request requests to participate in DR (power conditioning). DR request includes the content of the requested energy management (e.g., decrease DR or increase DR) and DR duration (DR starting time and DR end time). Increase DR is basically a DR requiring increased demand. However, if DER to which the request is received is a power generation facility, DR may require DER to restrict the power supply. On the other hand, the decrease DR is a DR requesting a demand control or a reverse power flow. A detailed description of DR request will be given later.

The server 500 holds information on each vehicle included in the vehicle group 1 (hereinafter, also referred to as "vehicle information"). The vehicle information is stored in a storage device of the server 500 and is sequentially updated. The server 500 periodically communicates with each vehicle included in the vehicle group 1, and sequentially receives vehicle information from each vehicle. Then, the server 500 updates the vehicle information in the storage device based on the received latest vehicle information. The vehicle information is distinguished by a vehicle ID (identification information of the vehicle).

The vehicle information includes, for example, a charging location, a specification of a power supply facility installed in the charging location (for example, information indicating a power supply capability), user position information (a position of a vehicle user), position information of the vehicle, a SOC of an in-vehicle battery, a system connection state (a plug-in state/a plug-out state), a state (on/oft) of the vehicle system, information set in the navigation system (for example, a travel route to a destination), data related to the movement of the vehicle (for example, data linking a position and a time of the vehicle with respect to the movement of the vehicle every day), and data related to the action of the vehicle user (for example, data linking the position and the time of the user with respect to the action of the user every day). When the specifications differ for each vehicle, the specifications of each vehicle (for example, the specifications regarding charging and discharging) may be registered in advance in the server 500.

The charging location of the vehicle 100 illustrated in FIG. 2 may be a home of a vehicle user (e.g., an EVSE 300 installation location). In this embodiment, while the vehicle 100 is traveling, each of the position of the vehicle 100 and SOC of the battery 11 is sequentially transmitted from the vehicle 100 to the servers 500 in real time. In addition, the latest system connection state is transmitted from the vehicle 100 to the server 500 at a timing when the plug-in state and the plug-out state are switched in the vehicle 100. In addition, the state of the latest vehicle system is transmitted from the vehicle 100 to the server 500 at the timing when the vehicle system is switched on/off in the vehicle 100. When the destination is set in NAVI 82, the traveling route searched by NAVI 82 is transmitted from the vehicles 100 to the servers 500.

The server 200 can acquire the above-described vehicle information from the server 500. The server 500 transmits vehicle information to the server 200, for example, in response to a request from the server 200. Further, the server 500 may periodically transmit the vehicle information to the server 200. The server 200 determines, at the time of starting the power adjustment (DR starting time), whether or not the preparation for the power adjustment is completed for each vehicle based on the vehicle data of the respective vehicles received from the server 500. Hereinafter, a vehicle in which preparation for power adjustment is completed in the vehicle group 1 is also referred to as a "standby vehicle". When the vehicle satisfies a predetermined requirement (hereinafter, also referred to as "standby requirement"), the server 200 determines that the vehicle is ready for power adjustment. The standby requirements according to this embodiment include that the vehicle is in the plug-in status (1SBY requirement), that SOC of the in-vehicle battery is within a predetermined SOC range (2SBY requirement), and that remote control by the servers 200 is permitted (3SBY requirement). In order for the standby requirements to be met, all of the first through 3SBY requirements must be met.

Regarding 1SBY requirement, for example, when the connector 320*a* of the charging cable 320 connected to the main body of EVSE 300 is connected to the inlet 60 of the vehicle 100, the vehicle 100 is brought into the plug-in state (see FIG. 2). The plug-in vehicles 100 are electrically connected to the power system PG.

With respect to the first 2SBY requirement, the predetermined SOC range is set, for example, by the servers 200. The predetermined SOC range is set to a range corresponding to the power regulation of the power system PG requested by DR. For example, the servers 200 may lower the upper limit value of the predetermined SOC range in an increase DR for requesting an increase in demand (e.g., charging of the power storage device), and may increase the lower limit value of the predetermined SOC range in a decrease DR for requesting a reverse power flow (e.g., discharging of the power storage device).

Regarding 3SBY requirement, ECU 150 (the control device of the vehicle 100) shown in FIG. 2 permits remote control by the servers 200 in a predetermined charging mode (permission mode). Although details will be described later, the permission mode in this embodiment includes a first charging mode and a second charging mode. The first charging mode is hereinafter also referred to as "smart charging mode". The second charging mode is hereinafter also referred to as "rough charging mode". When the smart charging mode or the rough charging mode is set in ECU 150, the remote charging control and the remote discharging control of the battery 11 by the servers 200 are permitted.

The servers 200 determine whether or not the vehicles that have requested DR in advance according to DR request satisfies the first to second 3SBY requirements at DR starting time. Then, the server 200 selects a vehicle for power adjustment from among the standby vehicles that satisfy the first to second 3SBY requirements. The selected vehicle is then sent a command for remote control (hereinafter, also referred to as a "VPP command"). Only the number of vehicles required for power adjustment is chosen. VPP command is, for example, a command for remote charge control or remote discharge control. The servers 200 adjust the power of the power system PG by remotely controlling the batteries of the selected vehicles to be charged or discharged. Hereinafter, a vehicle whose power is adjusted in accordance with VPP command is also referred to as a "VPP vehicle".

In the energy management system according to this embodiment, an incentive is given to the administrator of DER as a consideration for energy management using DER. For example, a user (administrator) of each vehicle included in the vehicle group 1 may make a contract with an aggregator in advance and receive a predetermined incentive when a predetermined requirement is satisfied. For example, when the vehicle performs power regulation according to VPP command, a second incentive requirement described later is satisfied, and an incentive is given to the vehicle user from the aggregator.

The server 200 is configured to manage an incentive given to an administrator who manages each vehicle included in the vehicle group 1. The vehicles included in the vehicle group 1 correspond to resources that can be electrically connected to the power system PG. Specifically, the servers 200 distinguish the vehicle ID and manage the incentives of the administrator (for example, the vehicle user) for each vehicle. For example, power exchanged between the power system PG and EVSE (power flow/reverse power flow) may be detected by a predetermined power meter (for example, at least one of a smart meter installed at a power receiving point and a power meter built in an EVSE) and transmitted to the servers 200. The server 200 may determine whether or not the power adjustment according to VPP command has been performed by the vehicle.

The server 200 holds data related to an incentive of a user (administrator) of each vehicle included in the vehicle group 1 (hereinafter, also referred to as "incentive data"). The server 200 updates the incentive data so as to give the vehicle user an incentive according to the satisfied requirement when the vehicle satisfies the predetermined requirement. Specifically, when the vehicle satisfies the predetermined first and second incentive requirements, the server 200 gives the first and second incentives to the vehicle user, respectively, and reflects the result in the incentive data.

Specifically, when the vehicle 100 illustrated in FIG. 2 is in the plug-in state (that is, when the inlet 60 is electrically connected to the power system PG), the first incentive requirement is satisfied, and the first incentive is given to the user of the vehicle 100. In other words, the first incentive is given to the user of the vehicle satisfying the first 1SBY requirement.

When the plug-in-state vehicle 100 charges and discharges the battery 11 to adjust the power of the power system PG, the second incentive requirement is satisfied and the user of the vehicle 100 is given the second incentive. That is, the user of VPP vehicle is given a second incentive.

The server 200 may calculate the first and second incentives based on a predetermined incentive unit price. Each unit price of the first and second incentives is arbitrarily determined by the contract. The incentive may be a general currency or a virtual currency. The incentive may be a point that can be exchanged for goods or services at a given store.

The server 200 is configured to predict the movement of each vehicle included in the vehicle group 1. The server 200 predicts the movement of each vehicle based on the vehicle information of each vehicle received from the server 500, for example. The server 200 performs the prediction each time it receives new information from the server 500. The server 200 performs prediction based on the latest information, thereby improving prediction accuracy.

The server 200 may acquire the travel plan from the information set in the navigation system. Examples of the travel plan include a departure point, a departure time from the departure point, a destination, an arrival time to the destination, and a travel route to the destination. The server 200 can predict the travel schedule of the vehicle (the transition of the position of the vehicle in the future) from the travel plan of the vehicle. The server 200 may estimate that the vehicle is in the parking state when the vehicle system is switched from on to off. When the parking state of the vehicle continues for a predetermined time or longer, the server 200 may estimate that the vehicle exists at the user's home or workplace. The server 200 may predict that the vehicle departs after a predetermined time when the vehicle system is switched from off to on. The servers 200 may use the position information and SOC information of the vehicle to predict the arrival time and the arrival time SOC of the vehicle at the destination while tracking the position of the vehicle. The server 200 may predict the travel schedule of the vehicle from historical data relating to the movement of the vehicle (e.g., weather information, congestion information, and historical location data managed separately by day of the week).

The server 200 may predict an action schedule of the user (a transition of a position of the user in the future), and may predict a movement schedule of the vehicle from the predicted action schedule of the user. The server 200 may determine whether the user is on the vehicle based on the position information of each of the vehicle and the user. The server 200 may use the position information of the user to predict the behavior of the user in the future while tracking the position of the user after getting down the vehicle. The server 200 may predict an action schedule of the user from historical data regarding the action of the user. The historical data related to the action of the user is, for example, weather information, traffic jam information, and past position data separately managed by the day of the week.

When the mobile application is activated in the mobile terminal 400, the mobile application requests user authentication (login). The user can log in by inputting predetermined authentication information to the mobile terminal 400. The mobile terminal 400 may obtain information (e.g., incentive data) regarding a user who has logged in to the mobile app from the server 200. After logging in, the mobile terminal 400 displays a screen A illustrated in FIG. 3.

Figure 3:
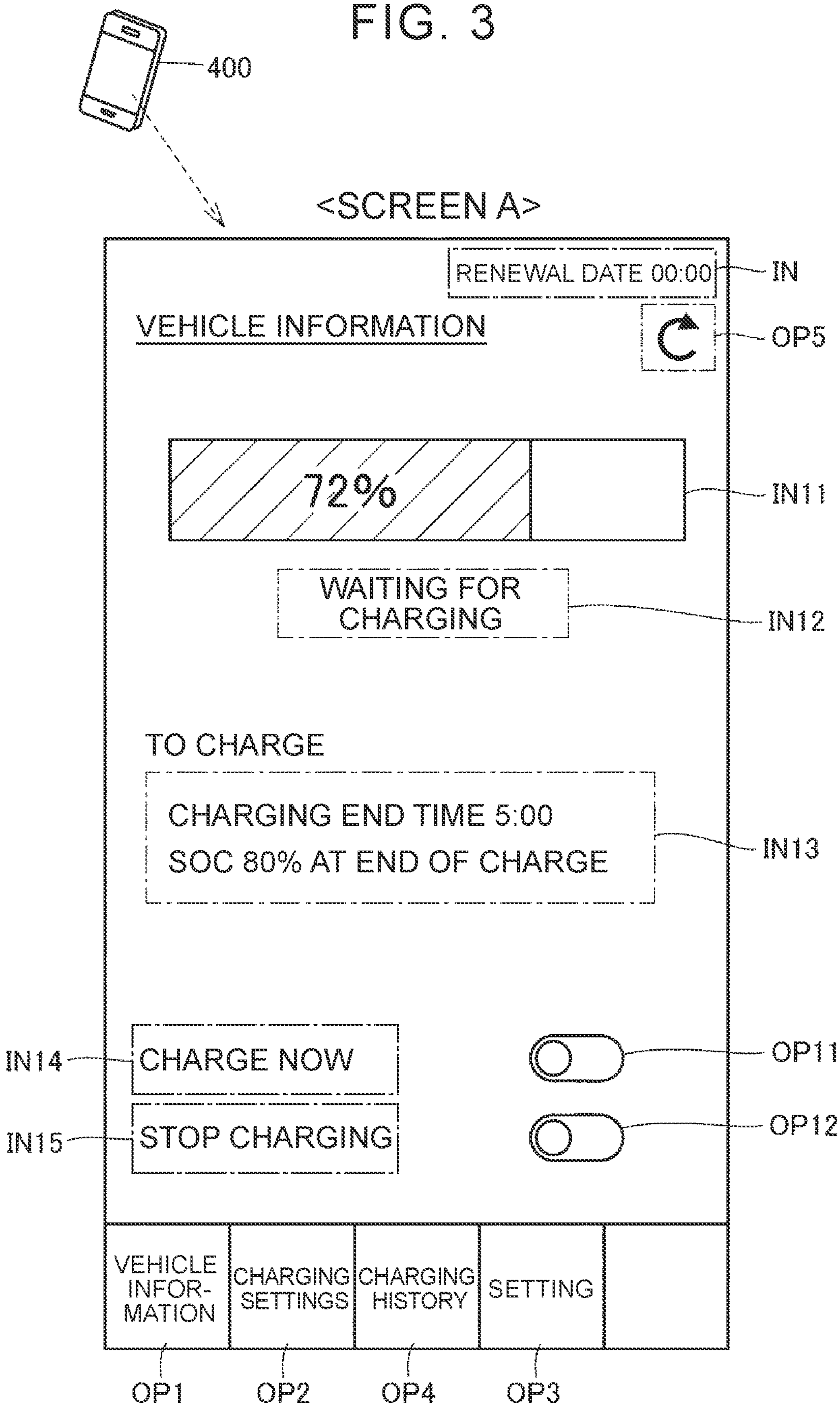
FIG. 3 is a diagram for describing a screen A displayed on the display device according to the embodiment of the present disclosure.

FIG. 3 is a diagram for describing a screen A displayed on a touch panel display of the mobile terminal 400. Referring to FIG. 3 together with FIGS. 1 and 2, the display A includes first to fifth operation unit OP1 to OP5 and an information unit IN. When the fifth operation unit OP5 is operated, the mobile terminal 400 executes a screen updating process so that the latest information is displayed on the screen A. When the fifth operation unit OP5 is operated, the mobile terminal 400 may request the latest information from at least one of the vehicles 100 and the servers 200. Even when a predetermined period of time has elapsed without the fifth operation unit OP5 being operated from the previous screen update, the mobile terminal 400 executes the screen update process. The information unit IN indicates the time (update date and time) at which the display was last updated.

The first to fourth operation units OP1 to OP4 accept the designation of the display. The mobile terminal 400 performs screen switching in response to an input from the user, and displays a screen designated by the user. For example, when the second operation unit OP2 (charge setting button) is operated on the screen A or the screen C (FIG. 6) or the screen D (FIG. 13), which will be described later, the mobile terminal 400 displays the screen B illustrated in FIG. 4, which will be described later. When the third operation unit OP3 (setting button) is operated in any of the screen A, B, D, the mobile terminal 400 displays the screen C illustrated in FIG. 6. When the fourth operation unit OP4 (charge history button) is operated on any one of the screens A to C, the mobile terminal 400 displays the screen D illustrated in FIG. 13. When the first operation unit OP1 (vehicle-information button) is operated on any one of the screens B to D, the mobile terminal 400 displays the screen A illustrated in FIG. 3.

The screen A is a screen for displaying information related to the vehicle 100. The display A further includes an information unit IN11 to IN15 and an operation unit OP11, OP12.

The information unit IN11 indicates the present SOC of the battery 11 (for example, detected by the monitoring module 11*a*). The information unit IN12 indicates a state of charge of the battery 11 (for example, either of a charge waiting state, a charge in progress, or a charge completion state). The information unit IN13 indicates information on the next charge (for example, a charge end time and a charge end time SOC). When the next charge is not set, the mobile terminal 400 may cause the information unit IN13 to display a message indicating that the next charge is not set.

The operation unit OP11 receives an instruction to initiate external charging. The information unit IN14 indicates an explanation of the operation unit OP11 (for example, "charge now"). The operation unit OP12 receives an instruction to stop the external charge. The information unit IN15 indicates an explanation of the operation unit OP12 (for example, "charge stoppage"). When the operation unit OP11 (toggle switch) is ON operated by the user, the mobile terminal 400 requests the vehicle 100 (ECU 150) to start external charging, and ECU 150 starts external charging of the battery 11 in response to the request. In this embodiment, the battery 11 is charged in response to an operation on the operation unit OP11. When the user ON operates the operation unit OP12 (toggle switch) during external charging of the battery 11, the mobile terminal 400 requests the vehicle 100 (ECU 150) to terminate the external charging, and ECU 150 stops the external charging of the battery 11 in response to the request. Also, when the battery 11 is fully charged during the external charging, ECU 150 stops the external charging of the battery 11.

The presence or absence of displaying each of the operation unit OP11 and OP12 may be controlled by the mobile terminal 400. The mobile terminal 400 may not display the operation unit OP11 and OP12 when the vehicles 100 are not in the plug-in status. The mobile terminal 400 may not display the operation unit OP11 while the external charge is being performed. The mobile terminal 400 may not display the operation unit OP12 when the external charge is not executed. According to such a display mode, the user can easily grasp the state of charge of the battery 11. Each operation unit cannot be operated when it is not displayed. The mobile terminal 400 can prohibit an operation on the operation unit by disabling the operation unit.

Figure 4:
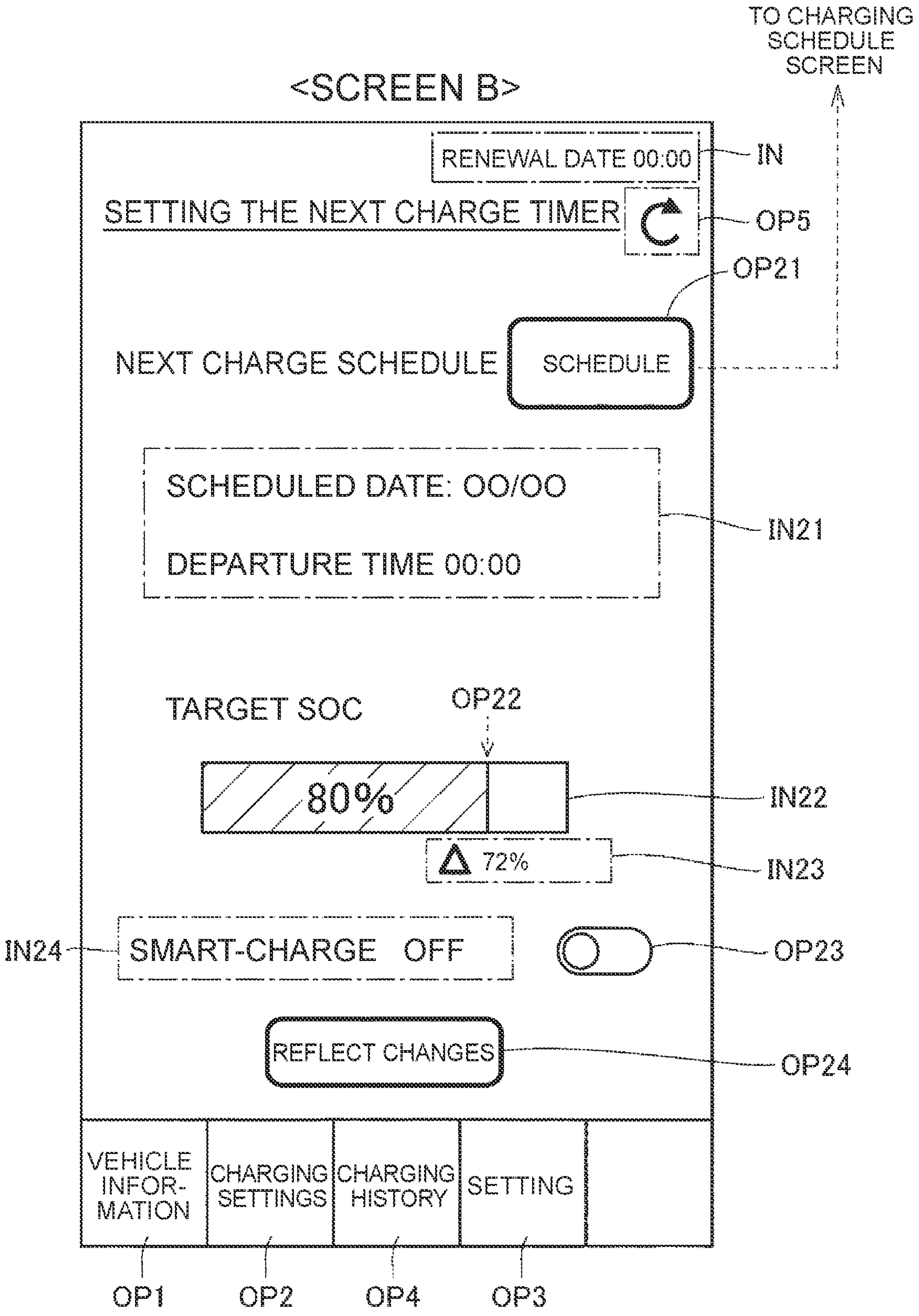
FIG. 4 is a diagram for describing a screen B displayed on the display device according to the embodiment of the present disclosure.

FIG. 4 is a diagram for explaining the screen B displayed on the touch panel display of the mobile terminal 400. The first to fifth operation unit OP1 to OP5 and the informing unit IN in the screen B shown in FIG. 4 are the same as the screen A (FIG. 3). The screen update processing on the screen B is also the same as the screen update processing on the screen A described above.

Referring to FIG. 4 together with FIGS. 1 to 3, a screen B is a screen for displaying information related to the next charge timer setting in the vehicle 100. The screen B further includes an information unit IN21 to IN24 and an operation unit OP21 to OP24.

The information unit IN21 indicates information on the next charge (e.g., the scheduled charge date and the scheduled departure time of the vehicles 100). The scheduled departure time may be the same as the charging end time (FIG. 3). When the user touches the area of the information unit IN21 on the screen B (touch panel screen), the mobile terminal 400 may perform screen switching to a screen for changing the next charge schedule (for example, a screen shown in FIG. 9 to be described later).

The information unit IN22 indicates the present target SOC. The target SOC may be the same as the end-of-charge SOC (FIG. 3). The information unit IN23 indicates the present SOC of the battery 11. The operation unit OP22 receives the target SOC. If the target SOC that is lower than the current SOC of the battery 11 indicated by the information-section IN23 is entered by the operation-section OP22, a confirmation message such as "the mobile terminal 400 indicates that the target SOC is lower than the current SOC, but is that okay?" may be displayed on the mobile terminal 400.

The operation unit OP23 receives an instruction as to whether or not to set the smart charge mode in the vehicle 100 (ECU 150). The information unit IN24 indicates an operation status (ON/OFF) of the operation unit OP23.

The operation unit OP24 receives an entry indicating the determination of the change content. Inputting to each of the operation unit OP22 and OP23 is enabled by operating the operation unit OP24.

Specifically, the information unit IN22 indicates the target SOC by a SOC bar having the left side as the low SOC side and the right side as the high SOC side. The present SOC of the battery 11 is indicated by the information-part IN23 (indicators) provided for this SOC bar. After changing the target SOC by sliding the operation unit OP22 (slider) to the left and right, the user can reflect the changed target SOC in the charge control by operating the operation unit OP24. Further, the user can set the smart charge mode in ECU 150 or cancel the smart charge mode set in ECU 150 by operating the operation unit OP23 (toggle switch) in ON mode or OFF mode and then operating the operation unit OP24. When the operation unit OP24 is operated, the mobile terminal 400 requests the condition change of the charging control (more specifically, the change to the condition specified by the operation unit OP22 and OP23) to the vehicle 100 (ECU 150), and ECU 150 changes the condition of the charging control of the battery 11 in response to the request.

Note that the mobile terminal 400 may display an operation unit that receives an instruction as to whether or not to set the self-charging mode in the vehicle 100 (ECU 150) in place of or in addition to the operation unit OP23 described above in the screen B.

Figure 5:
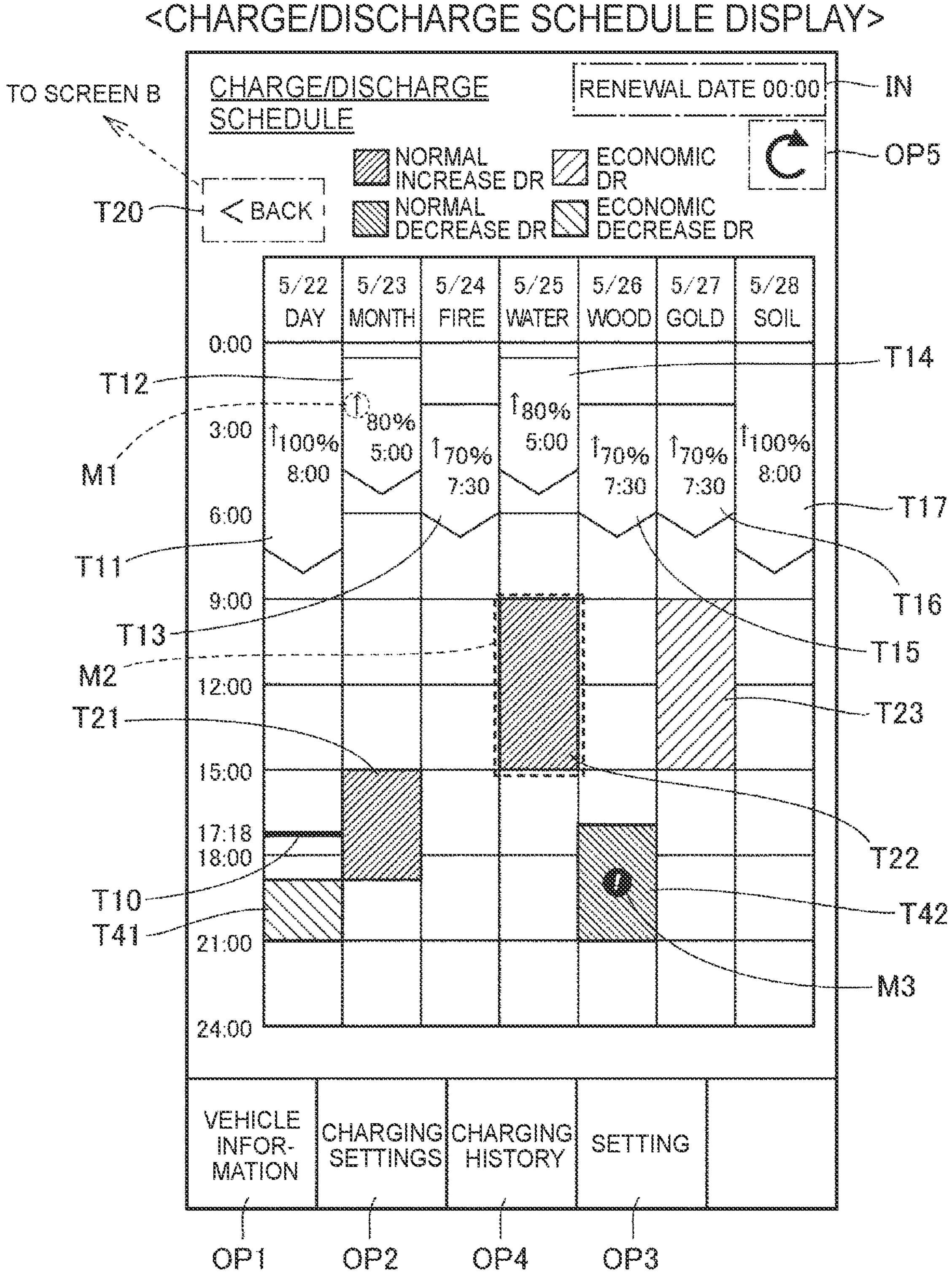
FIG. 5 is a diagram for describing a charge/discharge schedule screen displayed on the display device according to the embodiment of the present disclosure.

When the operation unit OP21 (schedule button) is operated on the screen B, the mobile terminal 400 displays the charge/discharge schedule screen shown in FIG. 5. FIG. 5 is a diagram for describing a charge/discharge schedule screen displayed on a touch panel display of the mobile terminal 400. The first to fifth operation unit OP1 to OP5 and the information unit IN in the charge/discharge scheduling screen shown in FIG. 5 are the same as those in the screen A (FIG. 3). The screen update processing on the charge/discharge schedule screen is also the same as the screen update processing on the screen A described above.

Referring to FIG. 5 together with FIGS. 1 to 3, the charge/discharge schedule screen is a screen for displaying the charge/discharge schedule of the vehicle 100 in a predetermined period. In the charge/discharge schedule screen shown in FIG. 5, the predetermined period is set to be one week from today (from May 22 to May 28), but the predetermined period can be arbitrarily set. The predetermined period may be variable in response to a request from the user.

The charge/discharge schedule window includes an information unit T10, an operation unit T20, a charging schedule T11 to T17, an increase DR schedule T21 to T23, and a decrease DR schedule T41, T42.

The information unit T10 indicates the present time. Each of the charge schedules T11 to T17 indicates a period in which the battery 11 is scheduled to be charged (externally charged). An up arrow (e.g., an arrow M1 attached to a charging schedule T12) attached to each of the charging schedule T11 to T17 indicates that each schedule is a charge schedule rather than a discharge schedule. However, the method of distinguishing between the charging schedule and the discharging schedule is not limited to the method of distinguishing the charging schedule and the discharging schedule in the direction of the arrow. The mobile terminal 400 may distinguish between the charge schedule and the discharge schedule by changing a mark, an image, a color, a size, a shape, a pattern, and the like.

Each of the increase DR schedules T21 to T23 indicates a period in which a DR (increase DR) requesting the battery 11 to be charged is scheduled. More specifically, a DR (e.g., a normal DR) for a power transmission and distribution operator is scheduled for each of the up T21 and T22. The increase DR schedule T23 indicates the timeframe during which DR (e.g., economic DR) for the retailer is scheduled. The increase DR schedule T21, T22 and the increase DR schedule T23 are simultaneously displayed on the charge/discharge schedule window in a manner distinguished from each other. The mobile terminal 400 according to this embodiment displays DR increase schedule T21, T22 and DR increase schedule T23 in an identifiable manner by changing the patterns of the two, but any way of distinguishing them is available. The mobile terminal 400 may distinguish between a DR schedule for a power transmission and distribution provider and a DR schedule for a retail utility by displaying marks, images, colors, sizes, shapes, and the like in a different manner.

The decrease DR schedules T41 and T42 each indicate a period in which a DR (decrease DR) requesting discharging of the battery 11 is scheduled. More specifically, the decrease DR schedule T41 indicates the timeframe during which DR (e.g., economic DR) for the retailer is scheduled. The decrease DR schedule T42 indicates a period in which a DR (for example, a normal DR) for a power transmission and distribution company is scheduled. The decrease DR schedule T41 and the decrease DR schedule T42 are simultaneously displayed on the charge/discharge schedule window in a manner distinguished from each other. The mobile terminal 400 according to this embodiment displays the decrease DR schedule T41 and the decrease DR schedule T42 in an identifiable manner by changing the patterns of the two, but any way of distinguishing them is available.

Among the increase DR schedule T21 to T23 and the decrease DR schedule T41, T42, the increase DR schedule T22 corresponds to the schedule of the unfixed DR, and the schedule other than the increase DR schedule T22 corresponds to the schedule of the fixed DR. A frame M2 is attached to the increase DR schedule T22. The mobile terminal 400 according to this embodiment displays the schedule of DR determined by adding a predetermined symbol (frame M2) to the schedule of the unfixed DR and the schedule of the unfixed DR in a manner that can be distinguished from each other. The mobile terminal 400 may distinguish between the schedule of the fixed DR and the schedule of the unfixed DR by changing the marking, the images, the colors, the sizes, the shapes, and the like.

Among the increase DR schedule T21 to T23 and the decrease DR schedule T41, T42, the decrease DR schedule T42 corresponds to a schedule of a DR (hereinafter, also referred to as "high tightness DR") required in a situation where the degree of tightness of power supply and demand in the power system PG is high. Schedules other than the decrease DR schedule T42 correspond to schedules of DR (hereinafter, also referred to as "low tightness DR") required under conditions where the degree of tightness of power supply and demand in the power system PG is low. The decrease DR schedule T42 is marked with a mark M3. The mobile terminal 400 according to this embodiment displays the schedules of the plurality of types of DR requested in situations where the degree of tightness of power supply and demand differs, in an identifiable manner, by attaching a predetermined marking (mark M3) to the schedule of the high tightness DR. However, the method of distinguishing them is optional. The mobile terminal 400 may distinguish between a plurality of types of scheduled DR that are requested in situations where the degree of tightness of power supply and demand differs, by changing the markings, images, colors, sizes, shapes, and the like.

As described above, the mobile terminal 400 simultaneously displays the charging schedule T11 to T17, the increase DR schedule T21 to T23, and the decrease DR schedule T41, T42 on the same screen (charge/discharge schedule screen). A method for the mobile terminal 400 to acquire each schedule will be described later (see FIG. 14).

The operation unit T20 receives an instruction to return the display. When the operation unit T20 (return button) is operated by the user, the mobile terminal 400 displays the above-described screen B.

Figure 6:
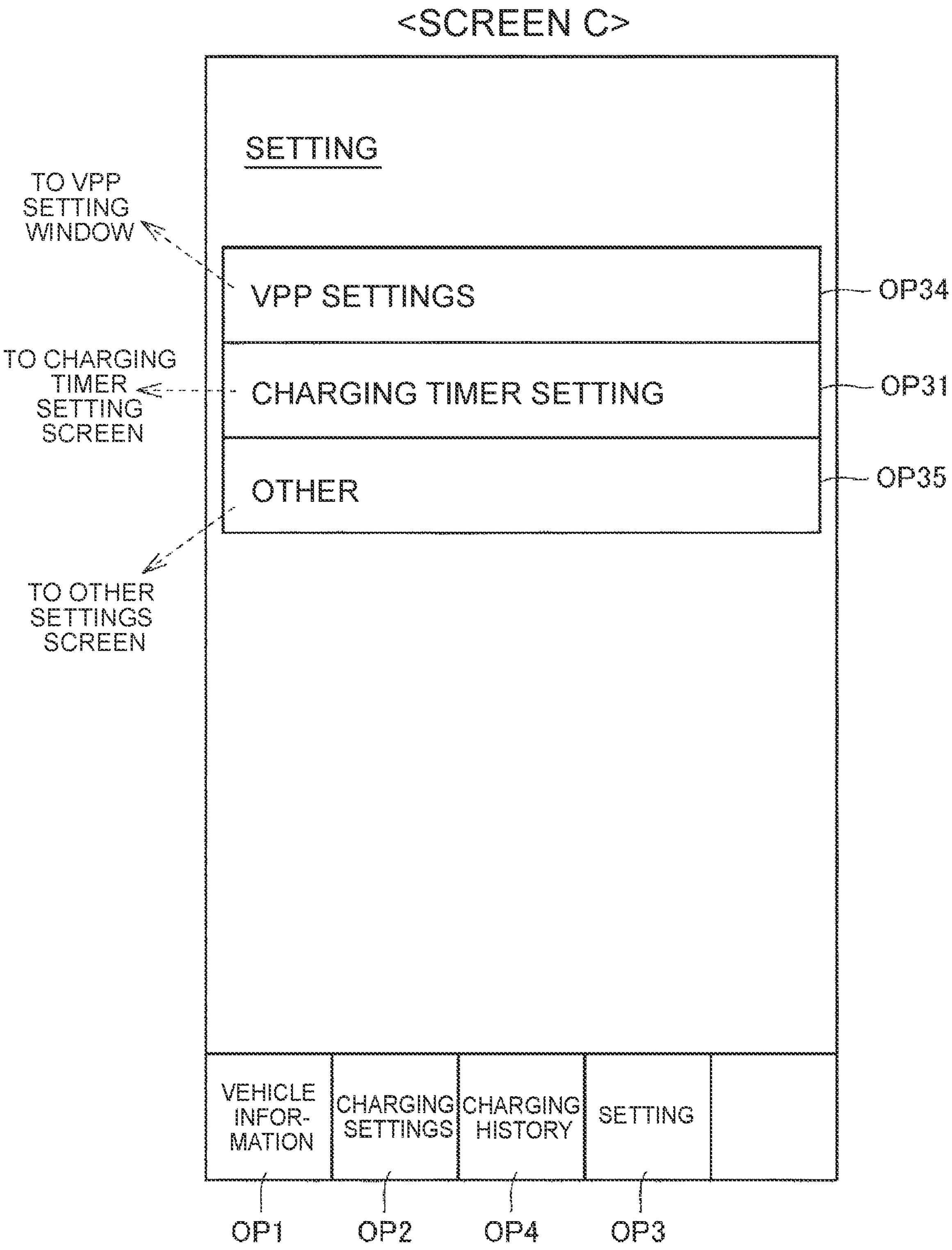
FIG. 6 is a diagram for describing a screen C displayed on the display device according to the embodiment of the present disclosure.

FIG. 6 is a diagram for describing a screen C displayed on a touch panel display of the mobile terminal 400. The first to fourth operation units OP1 to OP4 in the screen C shown in FIG. 6 are the same as the screen A (FIG. 3).

Referring to FIG. 6 together with FIGS. 1 to 3, a screen C is a screen for performing settings related to charging and discharging of the battery 11. The screen C further includes an operation unit OP31, OP34, OP35. When the operation unit OP31 (charge timer setting button) is operated on the screen C, the mobile terminal 400 displays the charge timer setting screen shown in FIG. 7.

Figure 7:
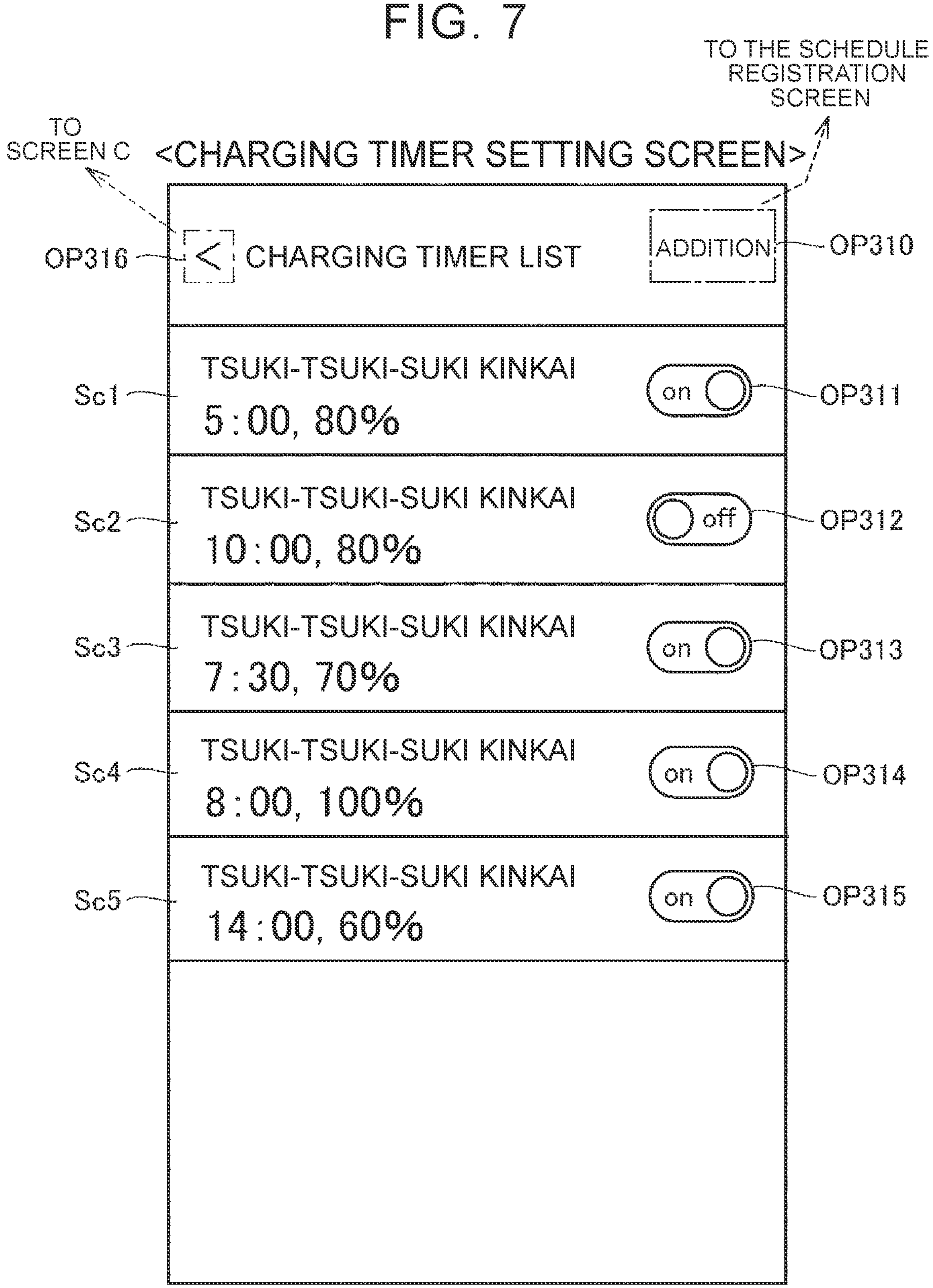
FIG. 7 is a diagram for describing a charging timer setting screen displayed on the display device according to the embodiment of the present disclosure.

FIG. 7 is a diagram for explaining a charging timer setting screen displayed on a touch panel display of the mobile terminal 400. Referring to FIG. 7, the charge timer setting window displays the set charge schedules Sc1 to Sc5. The charge timer setting window includes an operation unit OP310. The operation unit OP310 receives addition of a charge schedule. When the operation unit OP310 (addition button) is operated on the charging timer setting screen, the mobile terminal 400 displays a screen (schedule registering screen) for adding a charging schedule.

Figure 8:
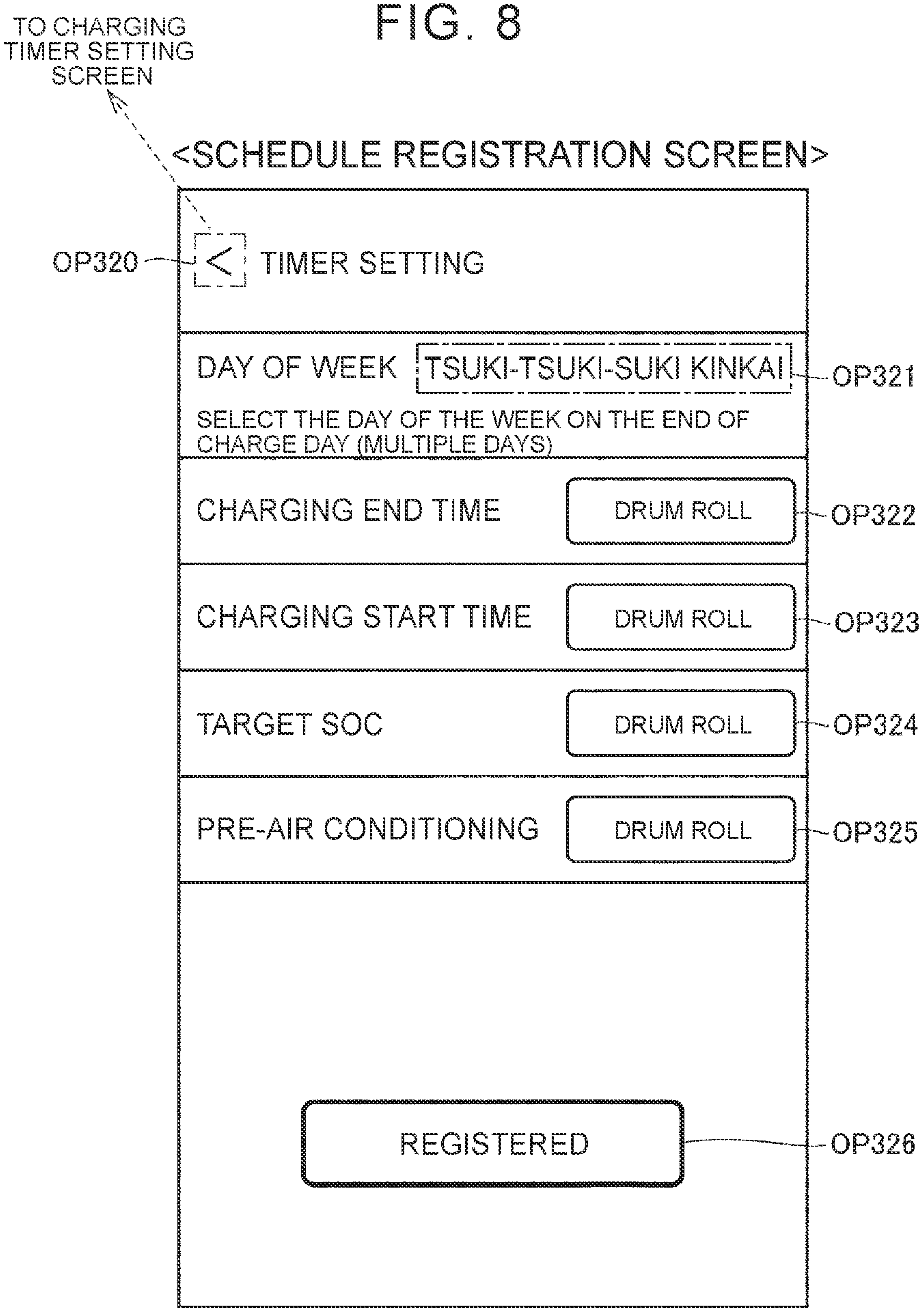
FIG. 8 is a diagram for describing a schedule registration screen displayed on the display device according to the embodiment of the present disclosure.

FIG. 8 is a diagram for describing a schedule registration screen displayed on the touch panel display of the mobile terminal 400. Referring to FIG. 8, the schedule-registering window includes an operation unit OP320 to OP326. The operation unit OP321, OP322, OP323, OP324, OP325 receives inputs of the day of the week, the charging end time, the charging start time, the target SOC, and the pre-air-conditioning temperature. The operation unit OP326 receives an input indicating that the input of the charge schedule has been completed. The user inputs the day of the week, the charging end time, the charging start time, the target SOC, and the pre-air-conditioning temperature by the operation unit OP321 to OP325 (drum roll), and then operates the operation unit OP326 (registration button), whereby the charging schedule of the day of the week designated by the operation unit OP321 can be registered in the mobile application. The charge scheduled to be registered in this manner includes the charge end time, the charge start time, the target SOC, and the pre-air-conditioning temperature specified by the operation unit OP322 to OP325. The user can simultaneously register the same charge schedule on a plurality of days of the week by selecting a plurality of days of the week using the operation unit OP321. However, it is not essential that the charging schedule includes the charging start time and the pre-air-conditioning temperature. When at least the day of the week, the charging end time, and the target SOC are inputted, the charging schedule is established. The registered charging schedule (set charging schedule) is added to the charging timer setting screen shown in FIG. 7.

When the operation unit OP326 (registered button) or the operation unit OP320 (return button) is operated by the user, the mobile terminal 400 displays the above-described charge timer setting window (FIG. 7). When the user touches any area of the charging schedule Sc1 to Sc5 on the charging timer setting screen (touch panel screen) shown in FIG. 7, the mobile terminal 400 displays a screen (schedule change screen) for changing or deleting the charging schedule (specified charging schedule) touched by the user.

Figure 9:
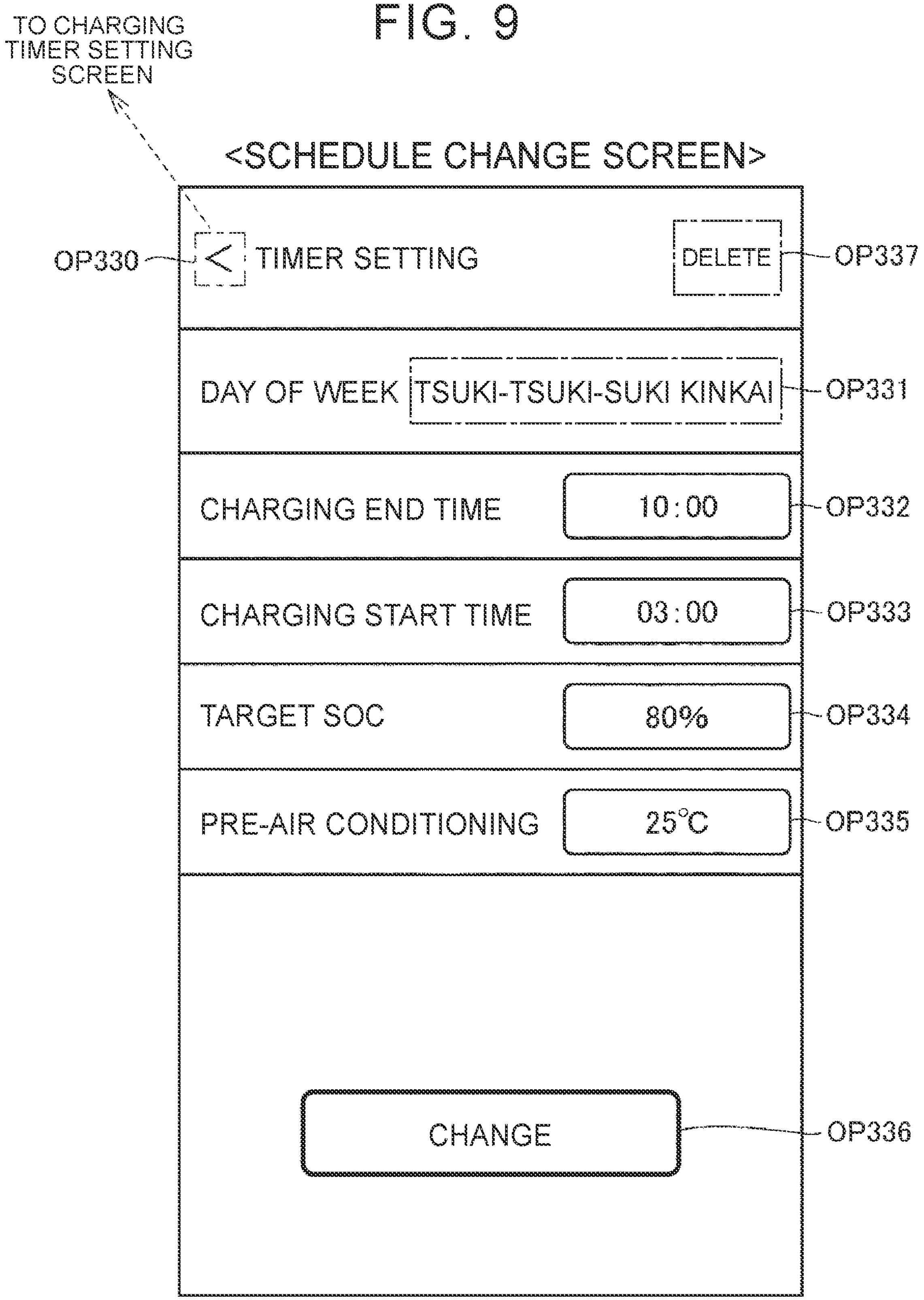
FIG. 9 is a diagram for describing a schedule change screen displayed on the display device according to the embodiment of the present disclosure.

FIG. 9 is a diagram for describing a schedule change screen displayed on the touch panel display of the mobile terminal 400. Referring to FIG. 9, the schedule-changing window includes an operation unit OP330 to OP337. The operation unit OP331, OP332, OP333, OP334, OP335 receives inputs of the day of the week, the charging end time, the charging start time, the target SOC, and the pre-air-conditioning temperature. The operation unit OP336 receives an input indicating that the change of the charge schedule has been completed. The operation unit OP337 receives an instruction to delete the charge schedule. The user can change the charging schedule by operating the operation unit OP336 (change button) after changing at least one of the day of the week, the charging end time, the charging starting time, the target SOC, and the pre-air-conditioning temperature of the designated charging schedule by the operation unit OP331 to OP335 (drum roll). When the operation unit OP337 (deletion button) is operated, the designated charge schedule is deleted. The changed or deleted contents are reflected in the charging timer setting screen shown in FIG. 7.

When the user operates the operation unit OP336 (change button), the operation unit OP337 (delete button), or the operation unit OP330 (return button), the mobile terminal 400 displays the above-described charge timer setting window (FIG. 7).

Referring back to FIG. 7, the charge timer setting window further includes an operation unit OP311 to OP315. The operation unit OP311 to OP315 is provided for the charging schedule Sc1 to Sc5 and receives an instruction as to whether or not to enable the corresponding charging schedule. When any one of the operation unit OP311 to OP315 (toggle switch) is ON operated, the corresponding charge schedule is enabled. Then, the mobile terminal 400 requests the vehicle 100 (ECU 150) to externally charge the battery 11 according to the activated charge schedule. In response to this requirement, the activated charge schedule is set to ECU 150. The switching of enabling/disabling of the charging schedule by the operation unit OP311 to OP315 is reflected in the charging/discharging schedule window shown in FIG. 5. Note that it is prohibited to enable the charging schedule in which the time zones overlap at the same time.

The charge timer setting window includes an operation unit OP316. When the operation unit OP316 (return button) is operated by the user, the mobile terminal 400 displays the above-described screen C (FIG. 6). When the operation unit OP34 (VPP setting button) is operated on the screen C shown in FIG. 6, the mobile terminal 400 displays VPP setting screen shown in FIG. 10.

Figure 10:
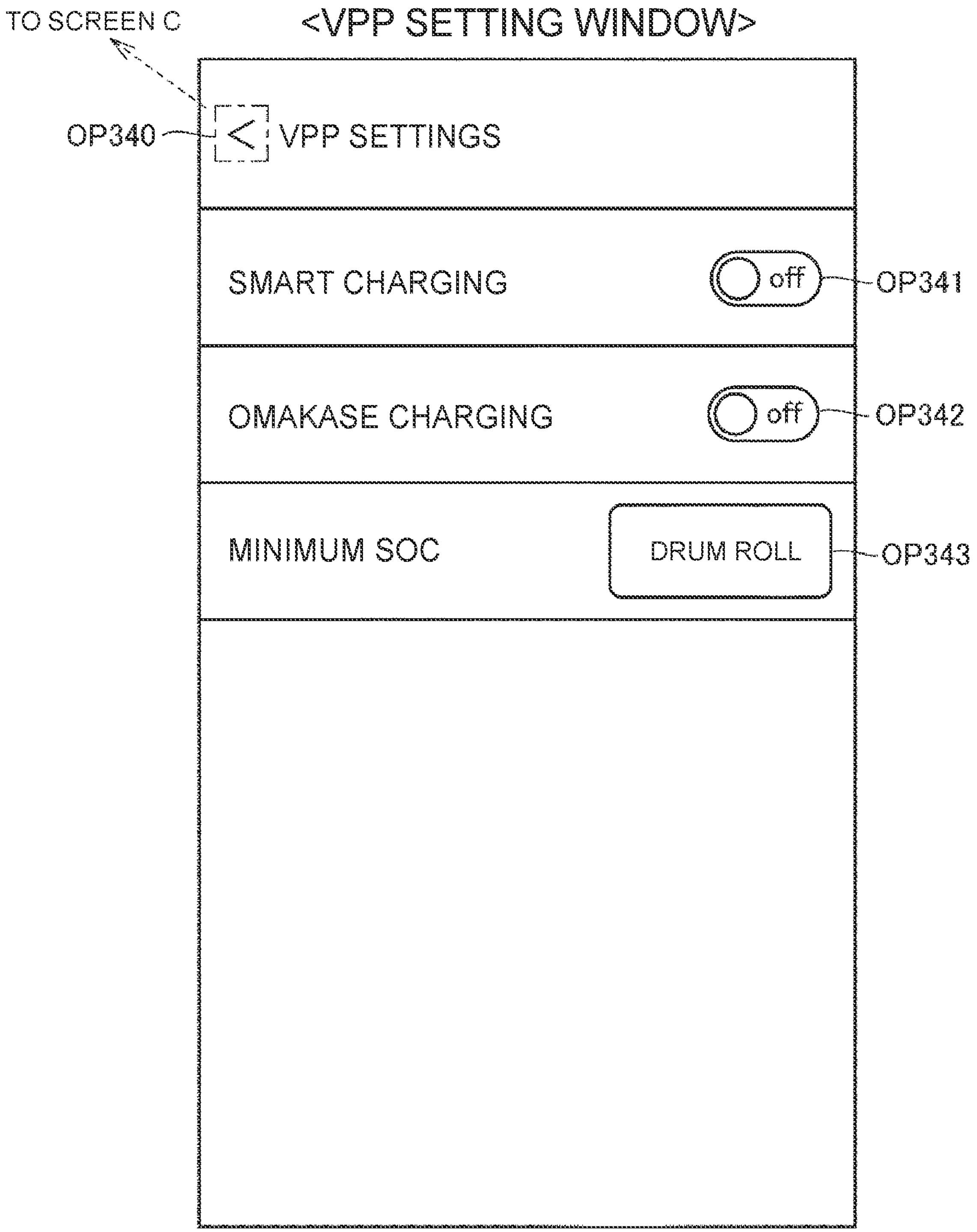
FIG. 10 is a diagram for describing a VPP setting window displayed on the display device according to the embodiment.

FIG. 10 is a diagram for describing a VPP setting window displayed on a touch panel display of the mobile terminal 400. Referring to FIG. 10, VPP setting screen is a screen for setting the charge mode and the minimum SOC. VPP setting window includes an operation unit OP340 to OP343.

The operation unit OP341 receives an instruction as to whether or not to set the smart charge mode in the vehicle 100 (ECU 150). The operation unit OP342 receives an instruction as to whether or not to set the self-charging mode in the vehicle 100 (ECU 150). The operation unit OP341 and the operation unit OP342 are interlocked with each other. When the operation unit OP341 (toggle switch) is ON operated, the operation unit OP342 is turned OFF, and when the operation unit OP342 (toggle switch) is turned ON, the operation unit OP341 is turned OFF.

One of the three types of charge modes is set to the vehicle 100 (ECU 150) by the operation unit OP341 and OP342. Specifically, when the operation unit OP341 is ON operated, the smart charge mode is set to ECU 150. When the operation unit OP342 is ON operated, the automatic charge mode is set to ECU 150. When both the operation unit OP341 and OP342 are OFF, the third charging mode (hereinafter, also referred to as "normal charging mode") is set to ECU 150. However, when none of the charge schedules set in the mobile terminal 400 is enabled, a transition operation to the smart charge mode (for example, an ON operation of the operation unit OP341) is prohibited.

The mobile terminal 400 transmits the charging mode set by the operation unit OP341 and OP342 to each of the vehicles 100 and the servers 200 together with a valid charging schedule (see FIG. 7). The vehicles 100 set the charge-mode received from the mobile terminal 400 to ECU 150. ECU 150 performs charge control of the battery 11 according to the set charge mode. ECU 150 permits remote control of the battery 11 by the servers 200 (e.g., remote charge control and remote discharge control according to VPP commands) in each of the smart charge mode and the rough charge mode. On the other hand, ECU 150 does not allow remote control of the battery 11 by the servers 200 in the normal charge mode.

The operation unit OP343 receives the lowest SOC. When the minimum SOC is input by the operation unit OP343 (drum roll), the mobile terminal 400 requests the vehicle 100 (ECU 150 to perform charge/discharge control according to the input minimum SOC, and ECU 150 changes the condition of charge/discharge control of the battery 11 in response to the request. The requested ECU 150 performs charge/discharge control (control of external charge and external power supply) of the battery 11 so that SOC of the battery 11 does not fall below the minimum SOC.

Figure 11:
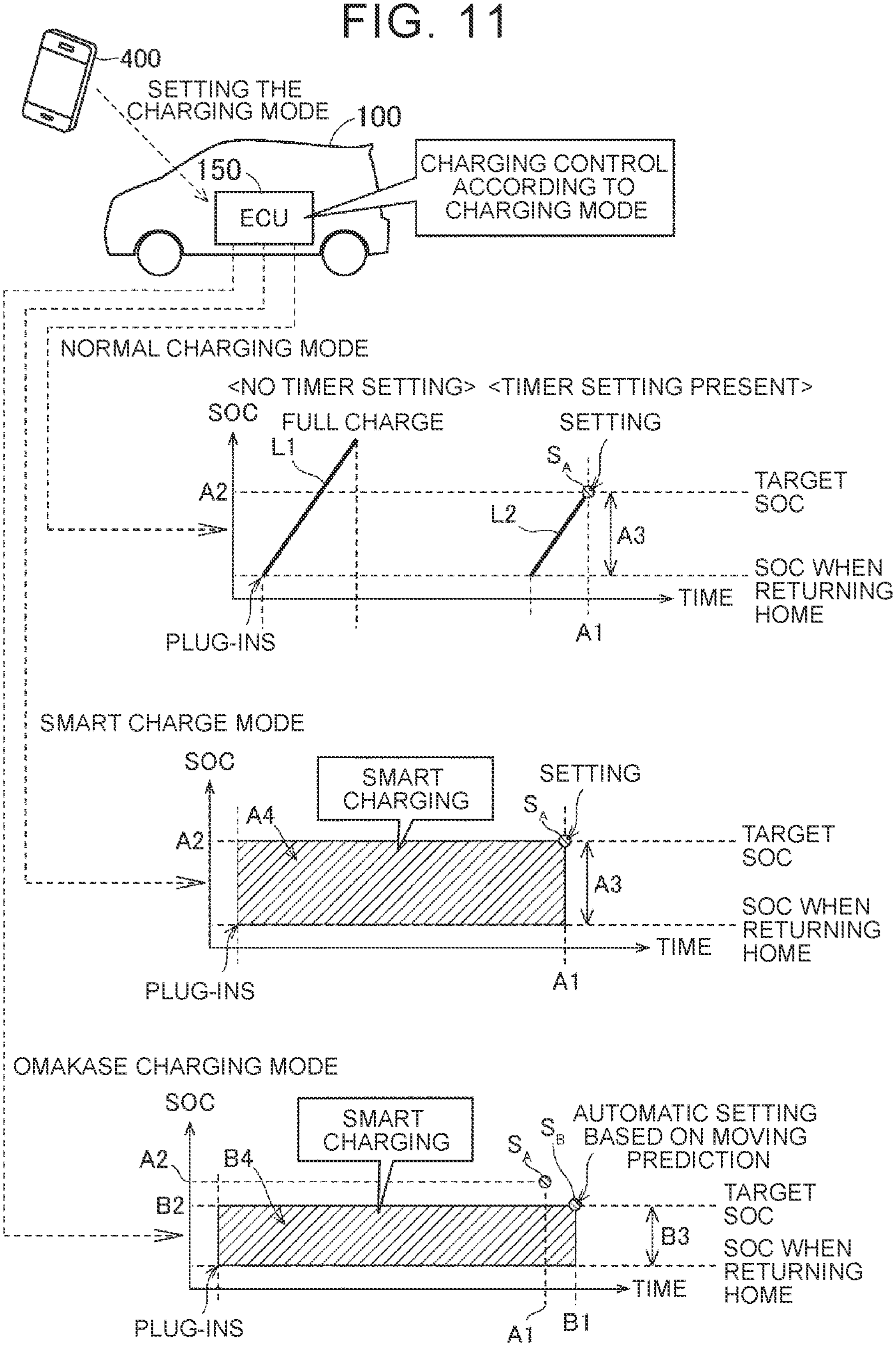
FIG. 11 is a diagram for describing three types of charging modes that can be set in the vehicle according to the embodiment of the present disclosure.

FIG. 11 is a diagram for describing three types of charging modes (a normal charging mode, a smart charging mode, and an approximate charging mode) that can be set in the vehicle 100. In the following, an exemplary case in which the user's requirement for charging is defined by the charging termination time and the target SOC will be described. However, the present disclosure is not limited thereto, and the user requirement may be defined by at least one of a charging start time (see FIGS. 8 and 9), a pre-air-conditioning temperature (see FIGS. 8 and 9), and a minimum SOC (FIG. 10) in addition to or in place of the charging end time and the target SOC. When the user requirement includes the charging start time, ECU 150 may perform the charging/discharging control of the battery 11 so that the external charging of the battery 11 is started at that time. When the user requirement includes the pre-air-conditioning temperature, ECU 150 may control the air-conditioning device 83 so that the temperature in the vehicle cabin of the vehicle 100 becomes the pre-air-conditioning temperature at the charge completion time. When the user requirement includes the minimum SOC, ECU 150 may perform the charge/discharge control of the battery 11 so that SOC of the battery 11 does not fall below the minimum. When SOC of the battery 11 falls below the minimum SOC and the vehicle 100 enters the plug-in state, ECU 150 may immediately start external charging of the battery 11 and terminate external charging when SOC of the battery 11 reaches the minimum SOC.

Referring to FIG. 11, the mobile terminal 400 sets the charge mode selected by the user to the vehicle 100 (ECU 150) as described above. The mobile terminal 400 transmits the charging mode set by the operation unit OP341 and OP342 (FIG. 10) to the vehicles 100 together with the scheduled next charging. The charging mode and the charging schedule received by the vehicles 100 are set to ECU 150. ECU 150 controls charging of the battery 11 in accordance with the set charging mode.

At least one of the servers 200 and 500 receives, from the mobile terminal 400, information on a charging mode and a charging schedule of the vehicle 100 (the battery 11) (for example, information defining a user requirement to be described later).

When the charging mode of the vehicle 100 is the normal charging mode, the mobile terminal 400 does not allow remote control by the server 200. ECU 150 performs charging of the battery 11 under local control. In the vehicle 100 in which the normal charging mode is set, different charging control is executed depending on whether or not the next charging (timer charging) is reserved in ECU 150. When at least one charging schedule is enabled in the charging timer setting window (FIG. 7), ECU 150 is reserved for the next charging (timer charging). In an ECU 150 where the normal charge mode is set and the next charge is not reserved (ECU without timer setting), the immediate charge is executed as indicated by the line L1. Immediate charging is an external charging that begins as soon as the vehicle 100 is in a plug-in state. The immediate charging according to this embodiment is terminated when the battery 11 is fully charged.

In an ECU 150 where the normal charging mode is set and the next charging is reserved (ECU with timer setting), as indicated by the line L2, the reserved next charging (more specifically, the charging of the battery 11 according to the valid charging schedule) is executed. In FIG. 11, the charge end time and the target SOC of the next charge reserved to ECU 150 by the user are indicated by coordinate values $S_A$ (end time A1 and target value A2) in the two-dimensional graph of time and SOC. The user requirement is defined by the coordinate value $S_A$. The user requirement according to the coordinate value $S_A$ is that SOC of the battery 11 is greater than or equal to the target value A2 at the end time A1. In ECU where the timer is set, the charge is executed in a period immediately before the end time A1. Charging is started so that SOC of the battery 11 reaches the target value A2 at the end time A1. Thus, the user requirements are satisfied. When the charging is executed immediately before the end time A1, the time during which the vehicles 100 are left unattended while SOC of the battery 11 is high is shortened, and the deterioration of the battery 11 is suppressed. The charge amount A3 indicates the amount of electric power inputted to the battery 11 by charging according to the coordinate value $S_A$.

When the charging mode of the vehicle 100 is the smart charging mode, the mobile terminal 400 permits remote control of the vehicle 100 by the server 200. However, the mobile terminal 400 does not allow the servers 200 to change the user requirements (coordinate values $S_A$). Specifically, when the mobile terminal 400 sets the smart charge mode to the vehicle 100 (ECU 150), the remote control of the battery 11 by the servers 200 is permitted. In ECU 150 where the smart charging mode is set, the smart charging of the battery 11 is permitted to the servers 200 in the smart charging period A4 from the time when the vehicle 100 returns home (at the plug-in time) to the end time A1. In the smart charging of the battery 11 in the smart charging mode, the servers 200 can freely charge and discharge the battery 11 as long as the user requirements according to the coordinate values $S_A$ are satisfied. The server 200 determines a charging schedule and a discharging schedule in the smart charging period A4, and transmits the charging schedule and the discharging schedule to each of the vehicle 100 and the mobile terminal 400. The mobile terminal 400 reflects the received charge/discharge schedule on the charge/discharge schedule screen shown in FIG. 5. SOC of the battery 11 increases by the amount of charge amount A3 from SOC at the time of returning home of the vehicles 100 due to the smart charge.

In ECU 150 where the automatic charging mode is set, the server 200 is permitted to set the user requirement and to smartly charge the battery 11 according to the set user requirement. The server 200 can set user requirements using the results of the above-described movement prediction of the vehicle 100. The servers 200 may predict the movements of the vehicles 100 using the learned models obtained by machine learning using AI (artificial intelligence). Until the learning is completed, a transition operation to the automatic charge mode (for example, an ON operation of the operation unit OP342 illustrated in FIG. 10) may be prohibited. When the learning for the movement prediction is completed, the mobile terminal 400 may pop up and display a summary description of the approximate charging mode.

With respect to the vehicle 100 in which the automatic charging mode is set, the server 200 sets the user requirement (charging end time and target SOC) by using the outcome of the predicted movement of the vehicle 100. Specifically, the server 200 acquires the scheduled departure time and the amount of electric power consumed in the next use (for example, the amount of electric power required for the next travel) from the predicted travel schedule of the vehicle 100. Then, the servers 200 set the acquired scheduled departure time as the charging finish time of the next charging, and set the target SOC of the next charging so that the amount of electric power (the amount of electric power without excess or deficiency) suitable for the next use can be stored in the battery 11. In FIG. 11, the charge end time and the target SOC of the next charge set in ECU 150 by the servers 200 are indicated by coordinate values $S_B$ (end time B1 and target value B2) in the two-dimensional graph of time and SOC. If the user requirement (coordinate value $S_A$) has already been set, the server 200 changes the user requirement from the coordinate value $S_A$ to the coordinate value $S_B$. The user requirement according to the coordinate value $S_B$ is that SOC of the battery 11 is greater than or equal to the target value B2 at the end time B1.

When the mobile terminal 400 sets the approximate charge mode to the vehicular 100 (ECU 150), remote control of the battery 11 by the servers 200 is permitted. In ECU 150 where the automatic charging mode is set, the server 200 is permitted to perform the smart charging of the battery 11 in the smart charging period B4 from the time of returning from home (at the time of plug-in) to the end time B1 of the vehicle 100. In the smart charging of the battery 11 in the approximate charging mode, the servers 200 can freely charge and discharge the battery 11 as long as the user requirements according to the coordinate values $S_B$ are satisfied. The server 200 determines a charging schedule and a discharging schedule in the smart charging period B4, and transmits the charging schedule and the discharging schedule to each of the vehicle 100 and the mobile terminal 400. The mobile terminal 400 reflects the received charge/discharge schedule on the charge/discharge schedule screen shown in FIG. 5. SOC of the battery 11 increases by the amount of charge B3 from SOC at the time of returning from home (at the time of plug-in) of the vehicles 100 due to the smart charge.

When the vehicle 100 is selected as a resource for DR, the mobile terminal 400 receives a DR request from the server 200. The servers 200 may perform charge/discharge control of the battery 11 for energy management (power regulation of the power system PG) requested by DR in the smart charging period A4 or B4. In the smart charging period A4 or B4, the servers 200 perform energy management (power regulation of the power system PG) by transmitting the aforementioned VPP command to the vehicles 100. When the vehicle 100 is participating in DR, the charging mode of the vehicle 100 is the smart charging mode or the rough charging mode, and the vehicle 100 charges or discharges the battery 11 in accordance with VPP command from the servers 200. In this way, the servers 200 remotely control the vehicles 100 to execute the energy management requested by DR.

Referring back to FIG. 10, when the user operates the operation unit OP340 (return button) on VPP setting screen, the mobile terminal 400 displays the screen C (FIG. 6) described above. When the operation unit OP35 (other setting button) is operated on the screen C shown in FIG. 6, the mobile terminal 400 displays the other setting screen shown in FIG. 12.

Figure 12:
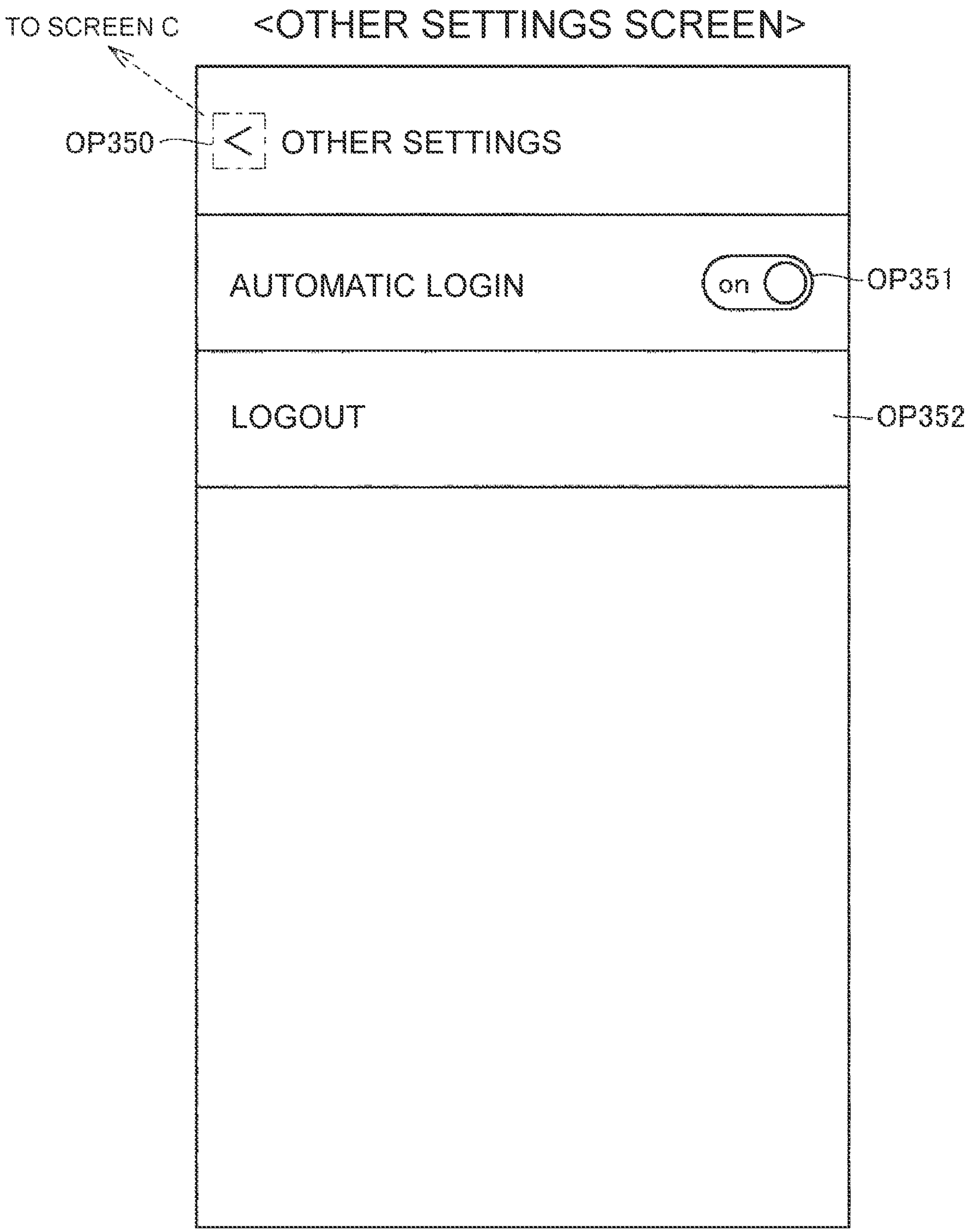
FIG. 12 is a diagram for describing another setting screen displayed on the display device according to the embodiment of the present disclosure.

FIG. 12 is a diagram for describing another setting screen displayed on the touch panel display of the mobile terminal 400. Referring to FIG. 12, the other setting screen is a screen for performing a setting related to the mobile application. The setting window includes an operation unit OP350 to OP352.

The operation unit OP351 receives an instruction as to whether to enable automatic login (automatic sign-in). When the operation unit OP351 (toggle switch) is ON operated, the auto-login is enabled, and the user authorization at the time of the next mobile application start-up is omitted. The operation unit OP352 receives an instruction to log out (sign out) the mobile application. When the operation unit OP352 (logout button) is operated, the mobile application is logged out. In a state where the mobile application is logged out, the mobile terminal 400 cannot acquire the user information and the vehicle information from the server 200.

When the operation unit OP350 (return button) is operated by the user on the other setting screen, the mobile terminal 400 displays the screen C (FIG. 6) described above.

Figure 13:
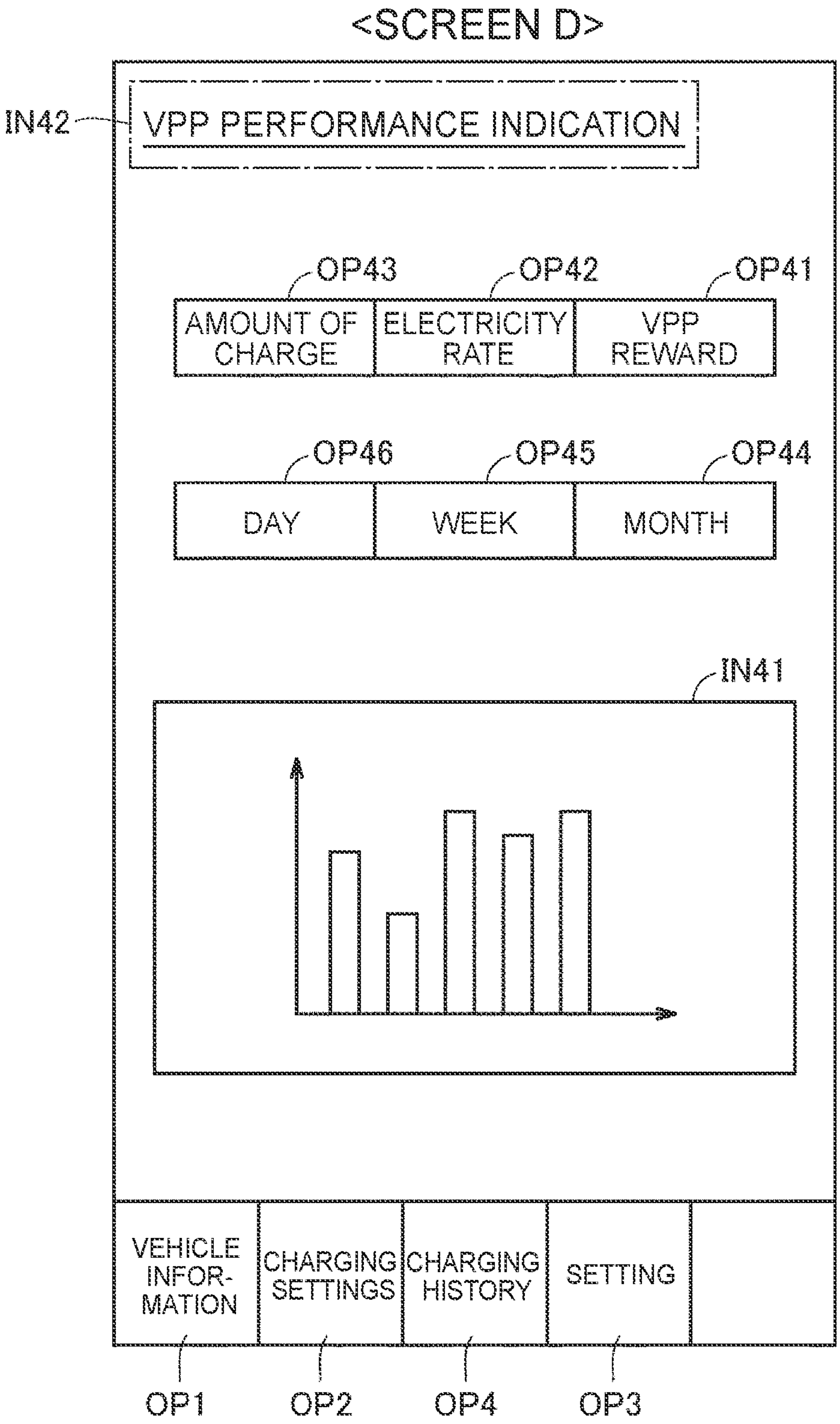
FIG. 13 is a diagram for describing a screen D displayed on the display device according to the embodiment of the present disclosure.

FIG. 13 is a diagram for explaining the screen D displayed on the touch panel display of the mobile terminal 400. The first to fourth operation units OP1 to OP4 in the screen D are the same as the screen A (FIG. 3).

Referring to FIG. 13, a screen D is a screen for displaying data related to charging and discharging (external charging and external power feeding) of the battery 11. The screen D includes an information-section IN41, IN42 and an operating-section OP41 to OP46. The mobile terminal 400 displays the data designated by the user on the information unit IN41. Further, the mobile terminal 400 displays the type of data displayed on the information unit IN41 on the information unit IN42.

Specifically, the mobile terminal 400 displays the data designated by the operation unit OP41 to OP46 on the information unit IN41. In the embodiment illustrated in FIG. 13, the data is displayed as a bar graph, but the display form of the information-section IN41 is not limited to the bar graph, and can be changed as appropriate. For example, data may be displayed in a line graph, or data may be displayed in the form of a table. Further, the mobile terminal 400 may change the display form in response to a request from the user.

The operation unit OP41 to OP43 receives an input of a type of data to be displayed on the information unit IN41. The operation unit OP41 to OP43 switches the type of data to be displayed. When the operation unit OP41, OP42, OP43 is operated, VPP results (i.e., incentives obtained by the administrator of the vehicle 100), the electric charge (yen), and the charge (kWh) are displayed on the information unit IN41. The operation unit OP44 to OP46 receives an input of a data-period to be displayed on the information-unit IN41. The horizontal axis of the chart is switched according to OP44 to OP46 of the operation unit. When the operation unit OP44. OP45, OP46 is operated, the last month, the last week, and the previous day are displayed on the information unit IN41.

The incentive is calculated by the server 200. The calculation method of the incentive is arbitrary. In this embodiment, the vehicle user may obtain the first and second incentives described above. The unit price of the first incentive may be a unit price (for example, a circle/hour) with respect to the time when the vehicle 100 continues the plug-in state. The server 200 may calculate the first incentive by multiplying the total time that the vehicle 100 has continued the plug-in state by the incentive unit price. The unit price of the second incentive may be a unit price with respect to the number of times of power adjustment, a unit price with respect to the adjusted amount of electric power (kWh), or a unit price with respect to the duration of power adjustment. The server 200 may calculate each of the second incentives by multiplying the number of times the vehicle user performs the power adjustment, the total amount of electric power, or the total time by the incentive unit price. The unit price of each incentive may be fixed or may be variable depending on the situation. The server 200 may determine the unit price of each incentive based on the price of the power market. A different incentive unit price may be set for each user according to the specifications of the resources held by the user.

Figure 14:
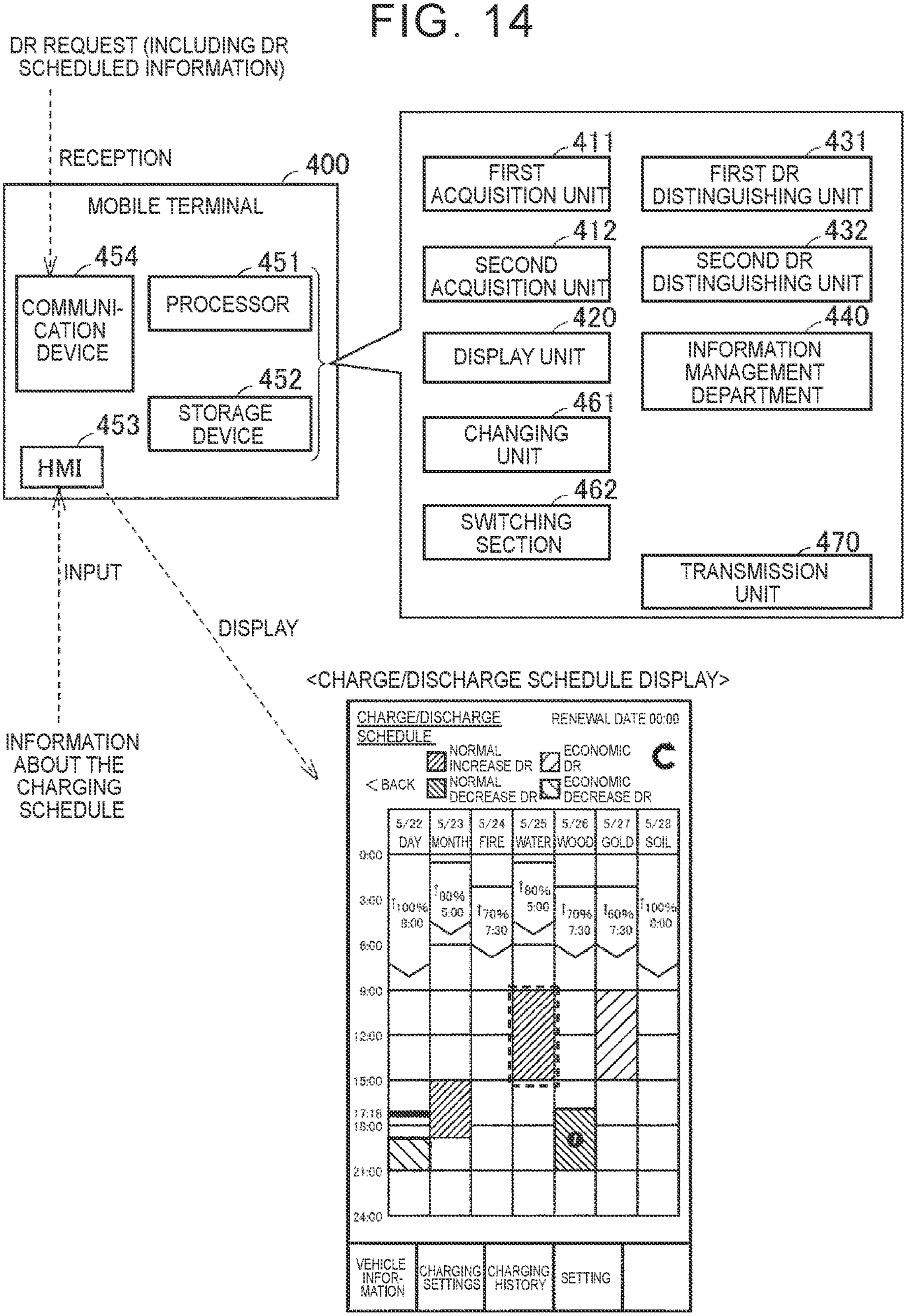
FIG. 14 is a diagram illustrating a configuration of a display device according to an embodiment of the present disclosure.

FIG. 14 is a diagram illustrating a configuration of the mobile terminal 400. Referring to FIG. 14, the mobile terminal 400 includes a processor 451, a storage device 452, a Human Machine Interface (HMI) 453, and a communication device 454. The processor 451 may be a Central Processing Unit (CPU). The storage device 452 stores a program to be executed by the processor 451 and information (for example, a map, a mathematical expression, and various parameters) used in the program. HMI 453 includes an inputting device and a displaying device. HMI 453 is, for example, a touch panel display. The processor 451 performs wireless communication with an external device of the mobile terminal 400 through the communication device 454. The mobile terminal 400 according to this embodiment corresponds to an example of a "display device" according to the present disclosure. The charge/discharge schedule screen illustrated in FIG. 5 corresponds to an example of a "schedule screen" according to the present disclosure.

In this embodiment, the mobile terminal 400 includes a first acquisition unit 411, a second acquisition unit 412, a display unit 420, a first DR distinguishing unit 431, a second DR distinguishing unit 432, an information management unit 440, a changing unit 461, a switching unit 462, and a transmission unit 470. The information management unit 440 functions as a "first information management unit" and a "second information management unit" according to the present disclosure. In this embodiment, the processor 451 executes a program stored in the storage device 452 to implement the above-described units. However, the present disclosure is not limited thereto, and the above-described units may be embodied by hardware (electronic circuit) included in the mobile terminal 400.

When the charging mode of the vehicles 100 is the normal charging mode, the first acquisition unit 411 acquires information about the charging schedule of the battery 11 from HMI 453 (an input device that receives an input from the user). For example, the first acquisition unit 411 receives input of information related to the charging schedule of the battery 11 on the screens illustrated in FIGS. 7 to 9. Then, the first acquisition unit 411 determines the charging start time and the charging end time on the basis of the information input from the user with respect to the charging schedule enabled on the charging timer setting screen (FIG. 7). For example, when the charging end time and the target SOC are inputted by the user, the first acquisition unit 411 determines the charging start time so that SOC of the battery 11 becomes equal to or larger than the target SOC at the charging end time. The determined charging starting time and charging end time are reflected in the charging/discharging schedule window shown in FIG. 5 (for example, refer to the charging schedule T11 to T17 shown in FIG. 5).

When the charging mode of the vehicle 100 is the smart charging mode or the rough charging mode, the first acquisition unit 411 acquires information on the charging schedule and the discharging schedule of the battery 11 from the communication device 454 that receives the information from the outside. For example, the communication device 454 receives, from the server 200, the charging start time and the charging end time related to the charging schedule and the discharging start time and the discharging end time related to the discharging schedule in the smart charging period A4 or B4 illustrated in FIG. 11, and the first acquisition unit 411 acquires these pieces of information from the communication device 454. The charging schedule and the discharging schedule acquired by the first acquisition unit 411 are reflected in the charging and discharging schedule screen shown in FIG. 5.

The servers 200 may perform DR on the group 1 to implement energy management (agreed energy management) awarded in the power marketplace. The server 200 may win a bid for energy management (e.g., tertiary coordination force-2) for the power transmission and distribution company in the supply-and-demand coordination market. DR for implementing such energy-management for transmission and distribution companies is usually equivalent to DR.

The aggregator (server 200) may enter into contracts with the retailer (server 900) to undertake economic DR. The servers 200 may perform an economic DR on the vehicle group 1 in order to perform energy management (energy management determined by a relative contract) requested by the retailer.

It should be noted that the commitment fee (ΔkW) that can be generated by satisfying the standby requirement in DR period, the adjusted power rate (kWh) that can be generated by adjusting the power in DR period, and the penalty fee that can be generated by not satisfying the standby requirement in DR period can be arbitrarily set by the contract.

The servers 200 perform the above-described agreed DR on the vehicle group 1 as the fixed DR. In addition to or in place of the fixed DR, the servers 200 may perform an unfixed DR on the vehicle group 1. The servers 200 may perform DR of requesting the energy management in the time-zone to be bidded on the vehicle group 1 as the unfixed DR. The servers 200 perform DR on the vehicle group 1 by transmitting a DR request signal to a terminal (for example, the mobile terminal 400 set in the vehicle 100) set in the respective vehicles included in the vehicle group 1.

The second acquisition unit 412 obtains information related to DR schedule from the communication device 454 that receives the information from the outside. For example, the communication device 454 receives DR request signal from the servers 200, and the second acquisition unit 412 acquires the information about DR schedule included in DR request signal from the communication device 454. DR request signal further includes first to third DR distinctions described below in addition to the content and DR duration of the energy management described above. The information management unit 440 stores various kinds of information included in DR request signal in the storage device 452, distinguishes each DR request signal (that is, each DR requested by the mobile terminal 400), and manages various kinds of information (including the first to 3DR distinguishing information) related to DR.

DR request signal includes information indicating whether the requested DR is a DR for a power transmission and distribution business operator or a DR for a retail power business operator (hereinafter, also referred to as "1DR distinction information"). The first DR distinguishing unit 431 classifies the requested DR into one of a DR for a power transmission and distribution business operator and a DR for a retail power business operator based on the first 1DR distinguishing data. The display unit 420 is configured to display the schedule of DR for the power transmission and distribution company and the schedule of DR for the retail power company on the charge and discharge schedule window shown in FIG. 5 in a manner distinguished from each other.

DR request signal includes information indicating a degree of tightness of power supply and demand of the power system PG during DR period (hereinafter, also referred to as "2DR distinction information"). The second DR distinction information corresponds to an example of the "information on the supply-and-demand status of the external power source adjusted by demand response" according to the present disclosure. The second DR discrimination data may indicate a degree of tightness of power supply and demand, based on a ratio of power demand to power supply. The larger the ratio of the power demand to the power supply, the higher the degree of tightness of the power supply and demand tends to be. However, the degree of tightness of the power supply and demand may be expressed by the supply reserve power or the supply reserve ratio (ratio of the supply reserve power to the demand power). The smaller the supply reserve capacity or the supply reserve ratio, the higher the degree of tightness in the electric power supply and demand tends to be.

The second DR distinguishing unit 432 distinguishes DR according to the degree of tightness of the power supply and demand of the power system PG. For example, the second DR distinguishing unit 432 classifies, in the power system PG, a DR scheduled in a time period in which the degree of tightness of power supply and demand exceeds a predetermined level, into a high tightness DR, and classifies a DR scheduled in a time period in which the degree of tightness of power supply and demand of the power system PG does not exceed the predetermined level, into a low tightness DR. The display unit 420 displays the schedules of the respective demand response (high tightness DR and low tightness DR) distinguished by the second DR distinguishing unit 432 on the charge/discharge schedule window shown in FIG. 5 in a manner distinguished from each other. In the charge/discharge schedule window shown in FIG. 5, the display unit 420 displays the schedule of the high tightness DR (for example, the decrease DR schedule T42) together with the mark M3, and displays the schedule of the low tightness DR (for example, the decrease DR schedule T41) without the mark M3.

DR request includes information indicating whether or not demand response is determined (hereinafter, also referred to as "3DR distinction information"). The display unit 420 displays a schedule indicating a time period in which the determined demand response is scheduled (for example, an increase DR schedule T21, T23) and a schedule indicating a time period in which an undetermined demand response is scheduled (for example, an increase DR schedule T22) on the charge/discharge schedule window shown in FIG. 5 in a manner distinguished from each other.

Figure 15:
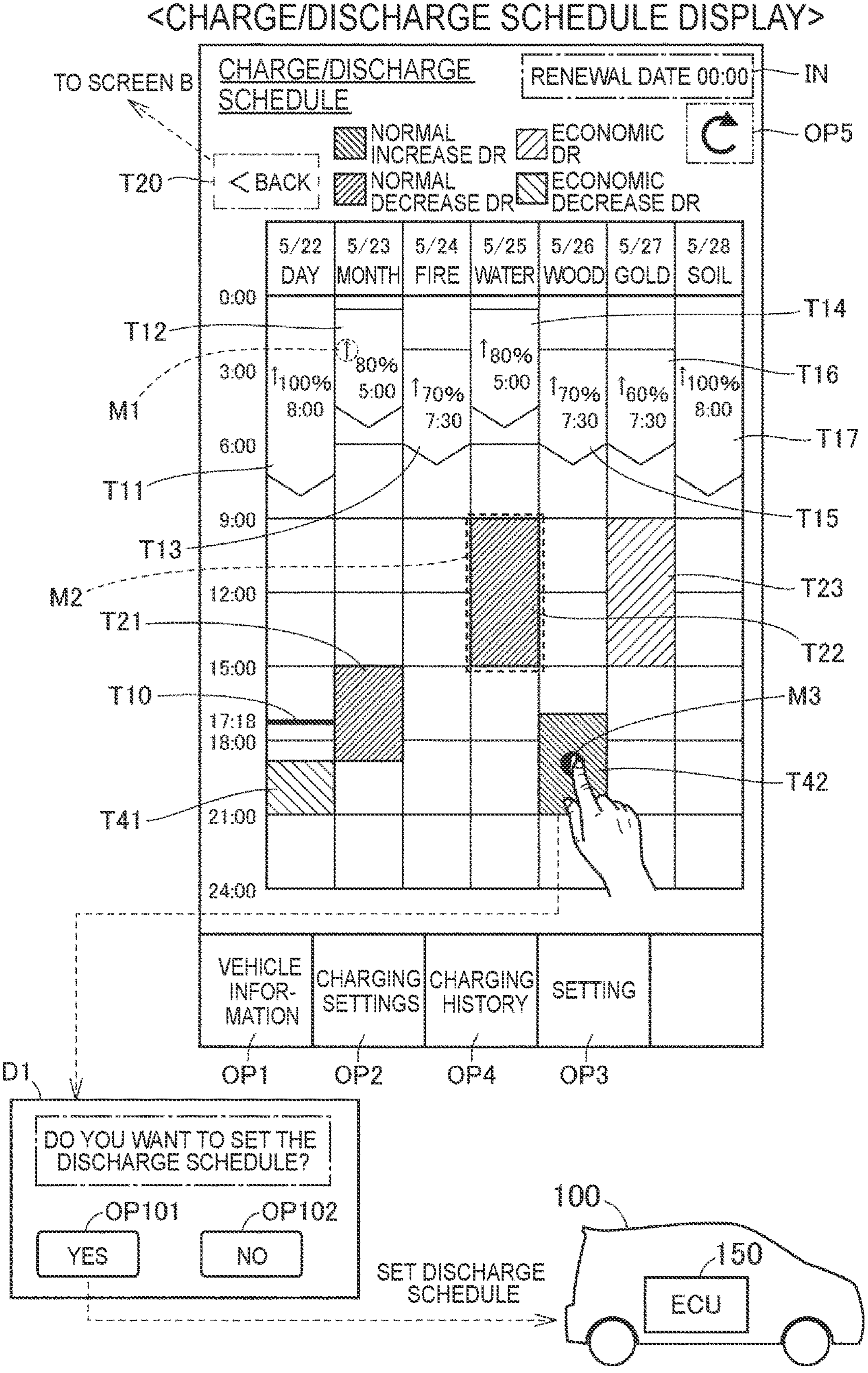
FIG. 15 is a diagram for describing an example of processing related to setting of a discharge schedule executed by the display device according to the embodiment of the present disclosure in response to an input from a user.
Figure 16:
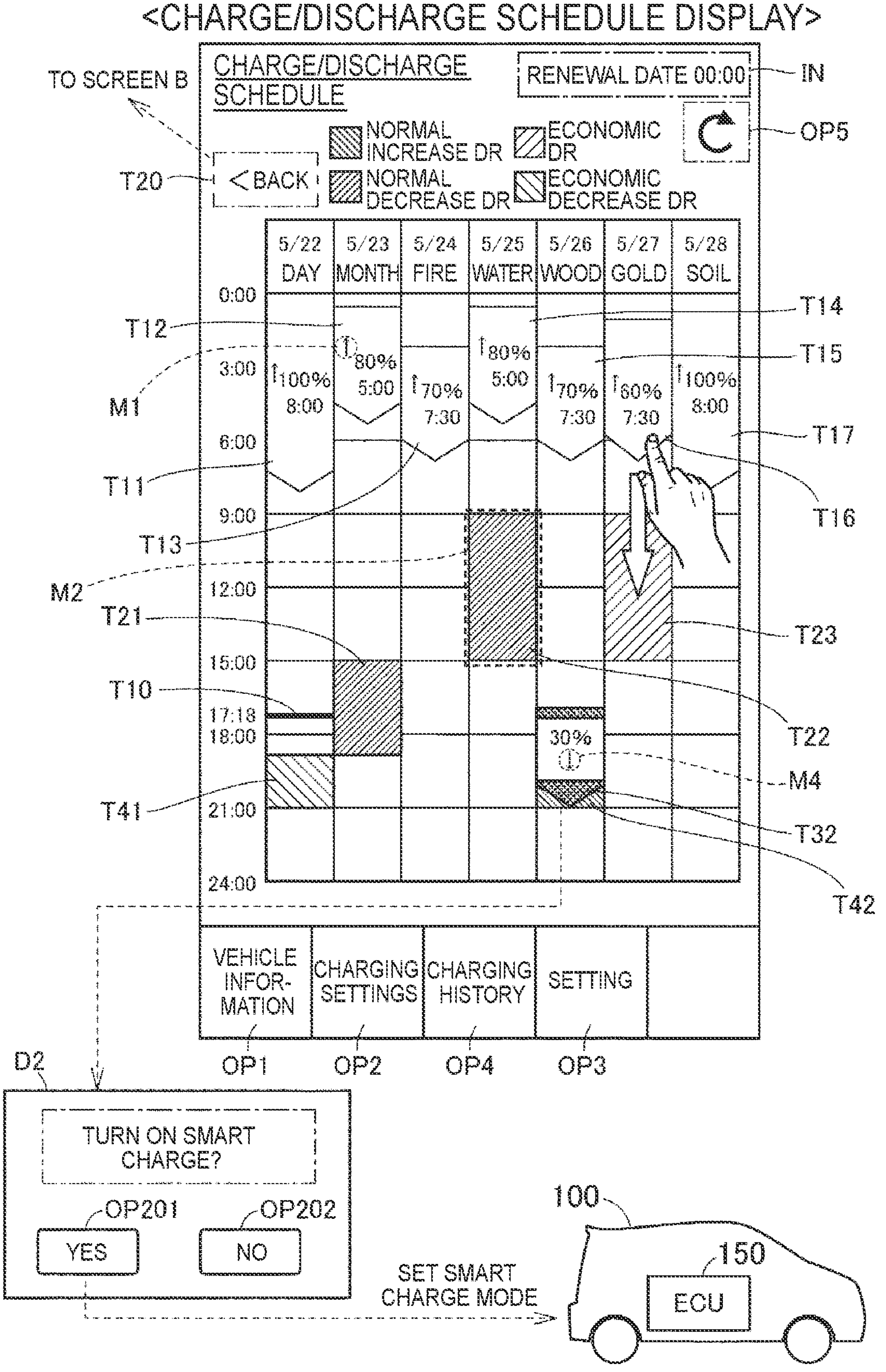
FIG. 16 is a diagram illustrating an example of a charge/discharge schedule screen in which a discharge schedule is set by the method illustrated in FIG. 15.
Figure 17:
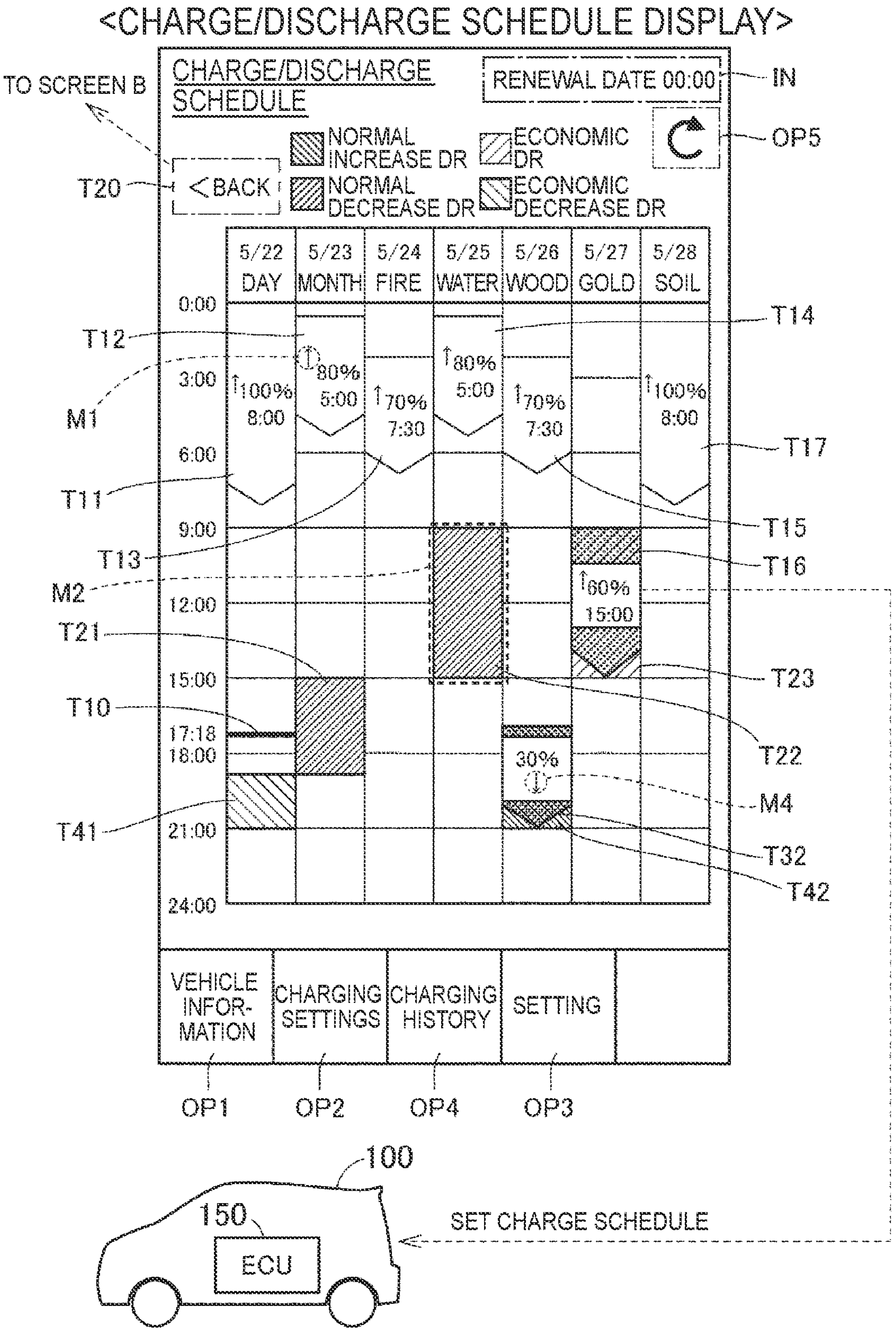
FIG. 17 is a diagram illustrating an example of a charge/discharge schedule screen in which a charge schedule is changed by the method illustrated in FIG. 16.

Various processes executed by the mobile terminal 400 in response to an input from a user will be described below with reference to FIGS. 15 to 17 together with FIG. 14. In the order of FIG. 15, FIG. 16, and FIG. 17, description will be given along time series. In the state of FIG. 15, it is assumed that the charging mode of the vehicle 100 is the normal charging mode.

FIG. 15 is a diagram for describing an example of processing related to setting of a discharge schedule executed by the mobile terminal 400 in response to an input from a user. Reference is made to FIG. 15 in conjunction with FIG. 14. On the charge/discharge schedule screen (touch panel screen), when the user touches an area where the decrease DR schedule T42 is displayed, the display unit 420 displays a screen D1. The screen D1 requests the user to enter information indicating whether or not to set the discharging schedule in response to the decrease DR schedule T42. The display D1 includes an operation unit OP101 (Yes button) and an operation unit OP102 (No button). When the operation unit OP101 is operated by the user, the first acquisition unit 411 acquires the discharging schedule corresponding to the decrease DR schedule T42. The discharge schedule acquired by the first acquisition unit 411 is set in the mobile terminal 400. As described above, in the embodiment illustrated in FIG. 15, the first acquisition unit 411 acquires the discharging schedule based on the user's manipulation on HMI 453. Then, the mobile terminal 400 reflects the set discharge schedule on the charge/discharge schedule screen and transmits the set discharge schedule to the vehicle 100. Vehicle 100 sets the received discharging schedule to ECU 150. On the other hand, when the operation unit OP102 is operated by the user, the mobile terminal 400 does not set the discharging schedule.

FIG. 16 is a diagram illustrating an example of a charge/discharge schedule screen in which a discharge schedule is set by the method illustrated in FIG. 15. Referring to FIG. 16 together with FIG. 14, when the operation unit OP101 is operated in the display D1 shown in FIG. 15, a discharging schedule is set corresponding to the decrease DR schedule T42. Then, the display unit 420 displays the discharging schedule T32 on the charge/discharge schedule window. The discharging schedule T32 indicates a period in which discharge (external power supply) of the battery 11 is scheduled. A down arrow (arrow M4) attached to the discharging schedule T32 indicates a discharge schedule rather than a charge schedule.

The display unit 420 indicates a charging start time, a charging end time, and a target SOC for each of the charging schedules T11 to T17. For example, the display unit 420 displays that the charging start time is about 1:00, the charging end time is 5:00, and the target SOC is 80% with respect to the charging schedule T12. In addition, the display unit 420 indicates the discharge starting time, the discharge end time, and SOC at the discharge end time for the discharging schedule T32. Specifically, the display unit 420 displays that, with respect to the discharging schedule T32, the discharge start time is about 17:00, the discharge end time is about 21:00, and SOC at the end of discharge is 30%.

The display unit 420 displays the charging schedule T11 to T17, the discharging schedule T32, the increase DR schedule T21 to T23, and the decrease DR schedule T41, T42 on the same time-axis. The display unit 420 superimposes the discharging schedule T32 (first schedule) and the decrease DR schedule T42 (second schedule) set in the same time zone on the charge/discharge schedule window. As illustrated in FIG. 16, the display unit 420 displays the discharging schedule T32 and the decrease DR schedule T42 in an identifiable manner.

When the discharging schedule T32 is set, the mobile terminal 400 updates the charging schedule T16 so that the user requirement (charging termination time and target SOC) is satisfied. Further, the display unit 420 displays the display D2. The display D2 requests the user to enter information indicating whether or not to change the charging mode of the vehicles 100 to the smart charging mode. The display D2 includes an operation unit OP201 (Yes button) and an operation unit OP202 (No button). When the operation unit OP201 is operated by the user, the switching unit 462 changes the charging mode of the vehicle 100 to the smart charging mode. Then, the mobile terminal 400 transmits the changed charging mode (smart charging mode) to the vehicle 100. Vehicle 100 sets the received charge mode to ECU 150. Thus, remote control of the battery 11 by the server 200 is permitted. The switching unit 462 allows the server 200 to remotely control the battery 11 by setting the smart charge mode to the vehicle 100 (ECU 150). On the other hand, when the operation unit OP202 is operated by the user, the switching unit 462 does not change the charge mode. As described above, the switching unit 462 switches whether or not the server 200 (second control device) is permitted to perform the charging and discharging of the battery 11 in accordance with the overlapping unit of the discharging schedule T32 and the decrease DR schedule T42 in accordance with the user's manipulation on the schedule window. The overlapping portion of the discharging schedule T32 and the decrease DR schedule T42 is a decrease DR schedule T42 displayed overlapping the discharging schedule T32.

The changing unit 461 changes the charging schedule and the discharging schedule displayed on the charging/discharging schedule screen in response to a user operation on the charging/discharging schedule screen. The user can raise the charging schedule T16 and move it to the position of DR schedule T23, for example, by dragging the charge/discharge schedule window. In response to the dragging operation, the changing unit 461 increases the charging schedule T16 and changes the charging schedule to a charging schedule corresponding to DR schedule T23.

FIG. 17 is a diagram illustrating an example of a charge/discharge schedule screen in which a charge schedule is changed by the method illustrated in FIG. 16. Referring to FIG. 17 together with FIG. 14, the transmission unit 470 transmits the charging schedule (charging schedule T16 corresponding to the increase DR schedule T23) changed by the changing unit 461 to ECU 150 (first control device). As a result, the scheduled charge after the change is set to ECU 150.

When the user touches any area of the charging schedule T11 to T17 on the charging/discharging schedule screen (touch panel screen), a screen switching to a screen (for example, the screen shown in FIG. 9) for changing the charging schedule touched by the user may be executed by the mobile terminal 400 (the changing unit 461).

As described above, the schedule display method (see FIG. 14) according to the above-described embodiment includes, for example, setting information on at least one schedule of charging and discharging of the power storage device to the mobile terminal 400 (information terminal) by inputting to HMI 453 from the user (setting step), requesting the mobile terminal 400 to charge or discharge of the power storage device by a DR request signal indicating information on demand response (requesting step), and displaying, simultaneously on the same schedule screen (for example, the charge and discharge schedule screen shown in FIG. 14), a first schedule indicating a time period during which charging or discharging of the power storage device is scheduled and a second schedule indicating a time period during which demand response is scheduled by the mobile terminal 400 that has received DR request signal by the communication device 454 (displaying step).

According to the above-described methods, the user can check whether or not the schedule of charge or discharge matches the timing of DR by looking at the schedule window. If the charging or discharging schedule does not match the timing of DR, the user can change the charging or discharging schedule in accordance with the timing of DR. That is, it is easy for the user to participate in DR to be participated. However, if the user does not want to participate in DR, the user may not change the charge/discharge schedule. According to the above method, the user can easily perform at least one of charging and discharging of the power storage device at an appropriate timing.

The energy management system according to the above embodiment includes a server 200 (energy management device) that requests charging or discharging of a power storage device (for example, the battery 11 of the vehicle 100) that can be electrically connected to a power system PG (external power source) by a demand response, and a mobile terminal 400 that functions as a display device. In the mobile terminal 400 according to the above embodiment, the first acquisition unit 411 obtains a charging schedule (for example, a charging schedule T11 to T17) indicating a time period in which charging of the power storage device is scheduled and a discharging schedule (for example, a discharging schedule T32) indicating a time period in which discharging of the power storage device is scheduled. The second acquisition unit 412 acquires an increase DR schedule (for example, an increase DR schedule T21 to T23) indicating a time period in which a demand response requesting to charge the power storage device is scheduled, and a decrease DR schedule (for example, a decrease DR schedule T41, T42) indicating a time period in which a demand response requesting to discharge the power storage device is scheduled. The display unit 420 simultaneously displays the charge schedule, the discharge schedule, the increase DR schedule, and the decrease DR schedule on a schedule screen (for example, the charge/discharge schedule screen shown in FIG. 17) in an identifiable manner.

According to the above configuration, the user can check whether or not the charge schedule matches the timing of the increase DR and whether or not the discharge schedule matches the timing of the decrease DR by looking at the schedule window. Therefore, it is easy for the user to participate in DR that the user wants to participate. According to the above configuration, the user can easily perform charging and discharging of the power storage device at an appropriate timing.

In the above-described embodiment, the charging schedule is established by designating the day of the week, the charging end time, and the target SOC. However, the present disclosure is not limited thereto, and the essential requirements of the charging schedule can be changed as appropriate. For example, the charging schedule of the designated date may be established by designating the date, the charging start time, and the charging end time.

The first schedule (charge schedule, discharge schedule) and the second schedule (DR schedule) are not limited to the form shown in FIG. 5, and can be changed as appropriate. For example, the display unit 420 of the mobile terminal 400 may display a daily schedule in a bar graph. In addition, the display unit 420 may display the requested contribution quantity with respect to the second schedule (DR schedule).

The display unit 420 of the mobile terminal 400 may be configured to display only one of the charging schedule and the discharging schedule. In addition, the display unit 420 may display only one of the increase DR and the decrease DR by distinguishing the schedule of the normal DR from the schedule of the economic DR. Furthermore, it is not essential that the display unit 420 displays schedules of a plurality of types of DR (for example, normal DR and economic DR), and may be configured to display only schedules of one type of DR.

The power system PG (external power supply) is not limited to a large-scale AC grid, and may be a microgrid or a DC (direct current) grid. The configuration of the energy management system is not limited to the configuration shown in FIG. 1. The server 200 may communicate with the server 700,900 via another server. Other servers (e.g., servers of upper aggregators) may be provided between the server 700,900 and the server 200. In addition, the server 200 may directly perform wireless communication with the vehicle group 1. The function of the server 500 may be implemented in the server 200, and the server 500 may be omitted. In the above-described embodiment, the on-premises servers (the servers 200 and 500 illustrated in FIG. 1) function as management computers. However, the present disclosure is not limited thereto, and functions of the servers 200 and 500 (in particular, functions related to resource management) may be implemented on the cloud by cloud computing. The management device 1000 may belong to other electric utilities (e.g., retailers or TSO) rather than aggregators.

At least a part of the functions of the mobile terminal 400 (in particular, the functions related to displaying) may be implemented in a terminal (e.g., a HMI 81 or a NAVI 82) mounted on the vehicle 100 (resourced). In such a configuration, HMI 81 or NAVI 82 functions as a display device (user interface). Alternatively, the mobile terminal 400 and HMI 81 or NAVI 82 may cooperate to function as a display device.

The configuration of the vehicle is not limited to the above-described configuration (see FIG. 2). The vehicle may include a charger (charging circuit) instead of the charger/discharger. In addition, the vehicle may include a discharger (discharge circuit) instead of the charger/discharger. The first control device (for example, an ECU 150 mounted on the vehicle 100) that locally controls the power storage device mounted on the vehicle may be configured to control only one of charge and discharge of the power storage device. A second control device (for example, a control device mounted on an external server such as the server 200) that remotely controls the power storage device mounted on the vehicle may be configured to control only one of charging and discharging of the power storage device. The power exchanged between the vehicles and EVSE is not limited to AC power, and may be DC power. Power converters (e.g., inverters) for charging or discharging on-board batteries may be mounted on EVSE rather than vehicles. The electric power discharged from the in-vehicle battery may be outputted to the external power source via the discharging connector instead of EVSE. xEV (PHEV, FCEV other than BEV, range extender EV, and the like may be employed as vehicles.

The vehicle may be configured to be contactless chargeable. The vehicle may comprise a solar panel. The vehicle may be configured to be able to perform autonomous driving or may be equipped with a flight function. The vehicle is not limited to a four-wheel passenger vehicle, and may be a bus or a truck. The vehicle may be a Mobility as a Service (MaaS) vehicle. The MaaS vehicle is a vehicle managed by a MaaS service provider. The vehicle may be an unmanned vehicle (for example, a robotaxi, an automated guided vehicle (AGV), or an agricultural machine). The vehicles may be unmanned or single-occupant small BEV (e.g., three-wheeled BEV, last-mile BEV, or electric skaters).

The resource including the power storage device may be a mobile body (a railway vehicle, a ship, an airplane, a drone, a walking robot, a robot cleaner, a space probe, or the like) other than the automobile. The resource may be a stationary power storage device used in a building (a house, a factory, etc.) or outdoors.

Various modifications described above may be implemented in any combination.

The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:

1. An information terminal comprising:

a first acquisition unit that acquires a first schedule indicating a time zone in which charging or discharging of a power storage device is scheduled;

a second acquisition unit that acquires a second schedule indicating a time zone in which a demand response for requesting charging or discharging of the power storage device is scheduled, wherein:

the first acquisition unit acquires the first schedule indicating a time zone in which charging of the power storage device is scheduled, and the first schedule indicating a time zone in which discharging of the power storage device is scheduled;

the second acquisition unit acquires the second schedule indicating a time zone in which a demand response for requesting charging of the power storage device is scheduled, and the second schedule indicating a time zone in which a demand response for requesting discharging of the power storage device is scheduled; and a display unit that displays a schedule screen, wherein the display unit simultaneously displays the following on the schedule screen in an identifiable manner:

the first schedule indicating a time zone in which charging of the power storage device is scheduled, the first schedule indicating a time zone in which discharging of the power storage device is scheduled, the second schedule indicating a time zone in which a demand response for requesting charging of the power storage device is scheduled, and the second schedule indicating a time zone in which a demand response for requesting discharging of the power storage device is scheduled.

2. The display device according to claim 1, further comprising a first DR distinguishing unit that distinguishes the demand response for a power transmission and distribution business operator and the demand response for a retail electric utility, wherein the display unit displays the following on the schedule screen in a manner distinguished from each other:

the second schedule indicating a time zone in which the demand response for the power transmission and distribution business operator is scheduled; and the second schedule indicating a time zone in which the demand response for the retail electric utility is scheduled.

3. The display device according to claim 1, further comprising a first information management unit that manages information indicating whether the demand response is fixed, wherein the display unit displays the following on the schedule screen in a manner distinguished from each other:

the second schedule indicating a time zone in which the fixed demand response is scheduled; and the second schedule indicating a time zone in which the unfixed demand response is scheduled.

4. The display device according to claim 1, further comprising:

a second information management unit that manages information about a supply-and-demand condition of an external power source for which supply-and-demand is adjusted by the demand response; and a second DR distinguishing unit that distinguishes the demand response in accordance with a degree of tightness of power supply and demand of the external power source, wherein the display unit displays the second schedule of each demand response that has been distinguished by the second DR distinguishing unit on the schedule screen in a manner distinguished from each other.

5. The display device according to claim 1, further comprising:

a changing unit that changes the first schedule displayed on the schedule screen in response to a user operation on the schedule screen; and a transmission unit that transmits the first schedule that has been changed by the changing unit to a first control device able to control at least one of charging and discharging of the power storage device.

6. The display device according to claim 1, wherein the display unit is configured to display the first schedule and the second schedule set in the same time zone on the schedule screen in a superimposed manner, and the display device further includes a switching unit that switches whether to allow a second control device able to control at least one of charging and discharging of the power storage device to execute charging or discharging of the power storage device in accordance with the second schedule displayed superimposing the first schedule, in response to a user operation on the schedule screen.

7. An energy management system comprising:

an energy management device that requests, by a demand response, charging or discharging of a power storage device electrically connectable to an external power source; and the display device according to claim 1.

8. The energy management system according to claim 7, wherein:

the external power source is a power system;

the power storage device is a power storage device mounted on a vehicle;

the first acquisition unit is configured to acquire information on the first schedule from an input device that receives an input from a user;

the second acquisition unit is configured to acquire information on the second schedule from a communication device that receives information from an outside; and each of the display device, the input device, and the communication device is mounted on a mobile terminal that manages information of the vehicle.

9. The energy management system according to claim 7, wherein:

the external power source is a power system;

the power storage device is a power storage device mounted on a vehicle;

the first acquisition unit is configured to acquire information on the first schedule from an input device that receives an input from a user;

the second acquisition unit is configured to acquire information on the second schedule from a communication device that receives information from an outside; and each of the display device, the input device, and the communication device is mounted on the vehicle.

10. A schedule display method comprising:

setting information on a schedule of at least one of charging and discharging of a power storage device to an information terminal;

requesting, by a demand response, the information terminal to charge or discharge the power storage device;

acquiring, by a first acquisition unit, a first schedule indicating a time zone in which charging of the power storage device is scheduled, and the first schedule indicating a time zone in which discharging of the power storage device is scheduled;

acquiring, by a second acquisition unit, a second schedule indicating a time zone in which a demand response for requesting charging of the power storage device is scheduled, and the second schedule indicating a time zone in which a demand response for requesting discharging of the power storage device is scheduled; and simultaneously displaying the following on a same schedule screen by the information terminal that has received a request by the demand response, in an identifiable manner:

the first schedule indicating a time zone in which charging of the power storage device is scheduled, the first schedule indicating a time zone in which discharging of the power storage device is scheduled, the second schedule indicating a time zone in which a demand response for requesting charging of the power storage device is scheduled, and the second schedule indicating a time zone in which a demand response for requesting discharging of the power storage device is scheduled.

* * * * *